United States Patent
Bixby et al.

(10) Patent No.: US 7,174,561 B2
(45) Date of Patent: Feb. 6, 2007

(54) MPEG DUAL-CHANNEL DECODER DATA AND CONTROL PROTOCOLS FOR REAL-TIME VIDEO STREAMING

(75) Inventors: Peter Bixby, Westborough, MA (US); John Forecast, Newton, MA (US); William O. Hultin, Middleboro, MA (US); Sorin Faibish, Newton, MA (US); Wayne W. Duso, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 1121 days.

(21) Appl. No.: 09/834,427

(22) Filed: Apr. 13, 2001

(65) Prior Publication Data

US 2003/0021346 A1   Jan. 30, 2003

(51) Int. Cl.
*H04N 7/173* (2006.01)
(52) U.S. Cl. .............................. 725/93; 725/91; 725/95
(58) Field of Classification Search .................. 725/91, 725/93, 95, 98, 101
See application file for complete search history.

(56) References Cited

U.S. PATENT DOCUMENTS

| | | | |
|---|---|---|---|
| 5,231,484 A | 7/1993 | Gonzales et al. ............ | 358/133 |
| 5,381,144 A | 1/1995 | Wilson et al. ................ | 341/63 |
| 5,534,944 A | 7/1996 | Egawa et al. ................ | 348/584 |
| 5,565,998 A | 10/1996 | Coombs et al. .............. | 386/46 |
| 5,675,384 A | 10/1997 | Ramamurthy et al. ....... | 348/405 |
| 5,694,170 A | 12/1997 | Tiwari et al. ................ | 348/390 |
| 5,742,623 A * | 4/1998 | Nuber et al. ................. | 714/798 |
| 5,793,897 A | 8/1998 | Jo et al. ....................... | 382/246 |
| 5,838,678 A | 11/1998 | Davis et al. .................. | 370/389 |
| 5,859,660 A | 1/1999 | Perkins et al. ................ | 348/9 |
| 5,892,915 A | 4/1999 | Duso et al. ............ | 395/200.49 |
| 5,959,690 A | 9/1999 | Toebes, VIII et al. ....... | 348/578 |

(Continued)

OTHER PUBLICATIONS

MPEG Wizard: MPEG Real-Time External Encoder, http://www.duplexx.com/mpgwiz.html, MPEG Wizard: MPEG Real-Time Encoder—Features and Software, http://www.duplexx.com/mpgwiz_f.html, MPEG Wizard: MPEG Reat-Time Encoder—Specs & Requirements, http://www.duplexx.com/mpgwiz_r.html, published at least as early as Mar. 19, 2001, 4 pages.

(Continued)

*Primary Examiner*—John Miller
*Assistant Examiner*—Hunter B. Lonsberry
(74) *Attorney, Agent, or Firm*—Richart Auchterlonie; Novak Druce & Quigg, LLP

(57) ABSTRACT

A system for producing multiple concurrent real-time video streams from stored MPEG video clips includes a video server and at least one MPEG decoder array. The decoder array has multiple decoder pairs, each pair having a video switch for switching from one decoder in the pair to the other at a specified time. Switching may occur from a specified Out-point frame to a specified In-point frame, and the specified frames can be any frame type at any location in the group of pictures (GOP) structure. In a preferred construction, the video server has a controller server linked to a series of data mover computers, each controlling one or more respective decoder arrays. The data mover computers use a control protocol to control the decoder arrays, and each decoder uses a data protocol to request data from a respective data mover computer.

5 Claims, 21 Drawing Sheets

U.S. PATENT DOCUMENTS

| | | | | |
|---|---|---|---|---|
| 5,969,650 | A | | 10/1999 | Wilson .................... 341/67 |
| 6,018,765 | A | * | 1/2000 | Durana et al. ............. 709/217 |
| 6,124,878 | A | * | 9/2000 | Adams et al. ............. 725/118 |
| 6,441,832 | B1 | * | 8/2002 | Tao et al. .................. 715/723 |
| 6,470,378 | B1 | * | 10/2002 | Tracton et al. ............. 709/203 |
| 2002/0129374 | A1 | * | 9/2002 | Freeman et al. ............. 725/91 |

OTHER PUBLICATIONS

Optivision MPEG-1 Encoder, http://brahma.imag.fr/Multimedia/jeudis/jeudi2/Optivision_mpeg1enc.html, published at least as early as Mar. 19, 2001, 3 pages.

Adrienne Electronics Corporation—Home Page, http://www.adrielec.com/, 1 page; Functional Grouping of LTC/VITC, VTR Interface, and Video Products, http://www.adrielec.com/listing.htm, 2 pages; Adrienne Electronics Products and Price Listings Catalog, http://www.adrielec.com/shortfor.htm, 8 pages; AEC-BOX-Aug. 18, 1928 Standalone VITC and/or LTC Time Code Generator, http://www.adrielec.com/box28lit.htm, 4 pages; AEC-BOX-Aug. 18, 1928 Standalone LTC/VITC Time Code Reader, http://www.adrielec.com/box20lit.htm, 5 pages, published at least as early as Mar. 15, 2001.

National P/N CLC020—SMPTE 259M Digital Video Serialized with Integrated Cable Driver, http://www.national.com/pf/CL/CLC020.html, published at least as early as Mar. 14, 2001, 3 pages.

TE600 MPEG-2 DSNG Encoder, satellite uplink equipment, downlink, teleports, earth stations, amplifiers, antennas, http://www.usacanada.net/satellite/te600.htm, published at least as early as Mar. 14, 2001, 3 pages.

TDR600/RA, satellite uplink equipment, downlink, teleports, earth stations, amplifiers, antennas, http://www.usacanada.net/satellite/tdr600-ra.htm, published at least as early as Mar. 14, 2001, 2 pages.

TE300A MPEG-2 Encoder, satellite uplink equipment, downlink, teleports, earth stations, amplifiers, antennas, http://www.usacanada.net/satellite/te300a.htm, published at least as early as Mar. 14, 2001, 3 pages.

TE-30, satellite uplink equipment, downlink, teleports, earth stations, amplifiers, antennas, http://www.usacanada.net/satellite/te30.htm, published as early as Mar. 14, 2001, 3 pages.

Y. Nakajima, H. Hori, and T. Kanoh, "Rate Conversion of MPEG Coded Video by Requantization Process," IEEE Proc. of ICIP-95, vol. III, Sep. 1995, pp. 408-411.

A.T. Erdem and M.I. Sezan, "Multi-generation Characteristics of the MPEG Video Compression Standards," IEEE Proc. of ICIP-94, vol. II, 1994, pp. 933-937.

M. Perreira, and A. Lippman, "Re-codable video," IEEE Proc. of ICIP-94, vol. II, 1994, pp. 952-956.

M. Mohsenian, R. Rajagopalan, and C.A. Gonzales, "Single-pass constant- and variable-bit-rate MPEG-2 video compression," IBM J. Res. Develop., vol. 43, No. 4, Jul. 1999, pp. 489-509.

P.H. Westerink, R. Rajagopalan, and C.A. Gonzales, "Two-pass MPEG-2 variable-bit-rate encoding," IBM J. Res. Develop., vol. 43, No. 4, Jul. 1999, pp. 471-488.

Jill Boyce, John Henderson, and Larry Pearlstein, "An SDTV Decoder with HDTV Capability: An All-Format ATV Decoder," Hitachi America LTD., file://C:Fatima\67.gif, pp. 67-75, published at least as early as Jan. 12, 2000.

Boon-Lock Yeo, "On fast microscopic browsing of MPEG-compressed video," IBM T.J. Watson Research Center, Jan. 1998, Multimedia Systems 7, 1999, pp. 269-281.

Robert Mokry and Dimitris Anastassiou, "Minimal Error Drift in Frequency Scalability for Motion-Compensated DCT Coding," IEEE Transactions on Circuits and Systems for Video Technology, vol. 4, No. 4, Aug. 1994, pp. 392-406.

C. Ward, C. Pecota, X. Lee, and G. Hughes, "Seamless Splicing for MPEG-2 Transport Stream Video Servers," SMPTE Journal, Dec. 1999, pp. 873-879.

Norm Hurst and Katie Cornog, "MPEG Splicing: A New Standard for Television—SMPTE 312M," SMPTE Journal, Nov. 1998, pp. 978-988.

Norm Hurst and Katie Cornog, "Splicing FAQ," http://www.mpeg.org/MPEG/splicing-FAW.html, 8 pages, published at least as early as Oct. 13, 1999.

SMPTE 312M-1999, SMPTE Standard for Television, "Splice Points for MPEG-2 Transport Streams," Approved Apr. 8, 1999, The Society of Motion Picture and Television Engineers, White Plains, NY, 20 pages.

"The Shape of MPEG," DV Magazine, vol. 4, No. 12, Dec. 1996, http://livedv.com/Mag/Dec96/Contents/mpeg/mpeg.html, 5 pages, published at least as early as Oct. 13, 1999.

"A Guide to MPEG Fundamentals and Protocol Analysis (Including DVB and ATSC)," Tektronix, In., Beaverton, Oregon, 1997, pp. 48 pages.

Leonardo Chiariglione, "MPEG and multimedia communications," CSELT, Torino Italy, http://www.cselt.stet.it/ufv/leonardo/paper/isce96.htm, 50 pages, published as least as early as Oct. 13, 1999.

Barry G. Haskell, Atul Puri, and Arun N. Netravali, MPEG-2 Video Coding and Compression, Chp. 8, pp. 156-182, and "Interactive Television," Chp. 13, pp. 292-306, Digital Video: An Introduction to MPEG-2, Chapman & Hall, New York, NY, 1997.

"MPEG-2: The basics of how it works," Hewlett Packard, published at least as early as Oct. 31, 1999, 17 pages.

Anil K. Jain, Fundamentals of Digital Image Processing, Prentice Hall, Inc., Englewood Cliffs, New Jersey, 1989, Chapter 4: Image Sampling and Quantization and Chapter 5: Image Transforms, pp. 80-188.

"Information technology—Generic coding of moving pictures and associated audio information: Systems," International Standard, ISO/IEC 13818-1:1996(E), 136 pages.

"Information technology—Generic coding of moving pictures an associated audio information: Video," International Standard, ISO/IEC 13818-2:1996(E), 211 pages.

"Information technology—Generic coding of moving pictures and associated audio information—Part 3: Audio," International Standard, ISO/IEC 13818-3:1995(E), 118 pages.

Jerry D. Gibson, Toby Berger, Tom Lookabaugh, Dave Lindbergh, and Richard L. Baker, Digital Compression for Multimedia: Principles and Standards, Morgan Kaufmann Publishers, Inc., San Francisco, CA, 1998, Chapter 9: JPEG Still-Image Compression Standard, pp. 291-308, and Chapter 11: MPEG Compression, pp. 363-417.

Barry G. Haskell, Atul Puri, and Arun N. Netravali, Digital Video: An Introduction to MPEG-2, Chapman & Hall, New York, NY, 1997, pp. 1-279, 292-306, 369-421.

Nilesh V. Patel and Ishwar K. Sethi, Compressed Video Processing For Cut Detection, Vision and Neural Networks Laboratory, Dept. of Computer Science, Wayne State University, Detroit, MI, Oct. 1997, 26 pages.

Nilesh V. Patel and Ishwar K. Sethi, Video Shot Detection and Characterization for Video Databases, Vision and Neural Networks Laboratory, Dept. of Computer Science, Wayne State University, Detroit, MI, Oct. 1997, 22 pages.

Bo Shen, Ishwar K. Sethi and Vasudev Bhaskaran, DCT Convolution and Its Application In Compressed Video Editing, Dept. of Computer Science, Wayne State University, Detroit, MI and Visual Computing Dept., Hewlett-Packard Laboratories, Palo Alto, CA, To appear in SPIE VCDIP '97, also submitted to IEEE Trans. Cir. and Sys. For Video Tech., 11 pages.

B. Shen and I.K. Sethi, Conolution-Based Edge Detection for Image/Video in Block DCT Domain, Vision & Neural Networks Laboratory, Dept. of Computer Science, Wayne State University, Detroit, MI, To appear in Journal of Visual Communications and Image Representation, 19 pages.

Bo Shen and Ishwar K. Sethi, Direct feature extraction from compressed images, Vision and Neural Networks Laboratory, Dept. of Computer Science, Wayne State University, Detroit, MI, SPIE vol. 2670, Storage & Retrieval for Image and Video Databases IV, 1996, 12 pages.

Bo Shen and Ishwar K. Sethi, Block-Based Manipulations On Transform-Compressed Images and Videos, Vision and Neural Networks Laboratory, Dept. of Computer Science, Wayne State University, Detroit, MI, To appear in Multimedia Systems, 26 pages.

Bo Shen and Ishwar K. Sethi, *Inner-Block Operations On Compressed Images*, Vision and Neural Networks Laboratory, Dept. of Computer Science, Wayne State University, Detroit, MI, *ACM Multimedia '95*, San Francisco, CA, Nov. 5-9, 1995, 10 pages.

Alexandros Eleftheriadis and Dimitris Anastassiou, *Constrained and General Dynamic Rate Shaping of Compressed Digital Video*, Dept. of Electrical Engineering and Center for Telecommunications Research, Columbia University, New York, NY, *Proceedings, 2nd IEEE International Conference on Image Processing (ICIP-95)*, Arlington, VA, Oct. 1995, 4 pages.

Alexandros Eleftheriadis and Dimitris Anastassiou, *Optimal Data Partitioning of MPEG-2 Coded Video*, Dept. of Electrical and Center for Telecommunications Research, Columbia University, New York, NY, *Proceedings, 1st International Conference on Image Processing (ICIP-94)*, Austin, Texas, Nov. 1994, 5 pages.

Andrew B. Watson, Joshua A. Solomon, Albert Ahumada, and Alan Gale, *DCT Basis Function Visibility: Effects of Viewing Distance and Contrast Masking*, (1994), 11 pages in B.E. Rogowitz (Ed.), Human Vision, Visual Processing and Digital Display IV (pp. 99-108), Bllington, WA, SPIE.

O'Reilly Network Broadcast 2000 Brings DV Editing to Linus (Aug. 11, 2000), http://www.oreillynet.com/pub/a/network/2000/08/11/magazine/broadcase2000.html, published at least as early as Mar. 27, 2001, 3 pages; Broadcast 2000, http://heroinewarrior.com/bcast2000.php3, published at least as early as Mar. 27, 2001, 4 pages.

MPEG Wizard: MPEG Real-Time External Encoder, http://www.duplexx.com/mpgwiz.html, MPEG Wizard: MPEG Real-Time Encoder—Features and Software, http://www.duplexx.com/mpgwiz_f.html, MPEG Wizard: MPEG Real-Time Encoder—Specs & Requirements, http://www.duplexx.com/mpgwiz_r.html, published at least as early as Mar. 19, 2001, 4 pages.

Optivision MPEG-1 Encoder, http://brahma.imag.fr/Multimedia/jeudis/jeudi2/Optivision_mpeg1enc.html, published at least as early as Mar. 19, 2001, 3 pages.

Adrienne Electronics Corporation—Home Page, http://www.adrielec.com/, 1 page; Functional Grouping of LTC/VITC, VTR Interface, and Video Products, http://www.adrielec.com/listing.htm, 2 pages; Adrienne Electronics Products and Price Listings Catalog, http://www.adrielec.com/shortfor.htm, 8 pages; AEC-BOX-Aug. 18, 1928 Standalone VITC and/or LTC Time Code Generator, http://www.adrielec.com/box28lit.htm, 4 pages; AEC-BOX-Aug. 18, 1928 Standalone LTC/VITC Time Code Reader, http:www.adrielec.com/box20lit.htmm 5 pages, published at least as early as Mar. 15, 2001.

National P/N CLC020—SMPTE 259M Digital Video Serializer with Integrated Cable Driver, http://www.national.com/pf/CL/CLC020.html, published at least as early as Mar. 14, 2001, 3 pages.

TE600 MPEG-2 DSNG Encoder, satellite uplink equipment, downlink, teleports, earth stations, amplifiers, antennas, http://www.usacanada.net/satellite/te600.htm, published at least as early as Mar. 14, 2001, 3 pages.

TDR600/RA, satellite uplink equipment, downlink, teleports, earth stations, amplifiers, antennas, http://www.usacanada.net/satellite/tdr600-ra.htm, published at least as early as Mar. 14, 2001, 2 pages.

TE300A MPEG-2 Encoder, satellite uplink equipment, downlink, teleports, earth stations, amplifiers, antennas, http://www.usacanada.net/satellite/te300a.htm, published at least as early as Mar. 14, 2001, 3 pages.

TE-30, satellite uplink equipment, downlink, teleports, earth stations, amplifiers, antennas, http://www.usa.canada.net/satellite/te30.htm, published at least as early as Mar. 14, 2001, 3 pages.

* cited by examiner

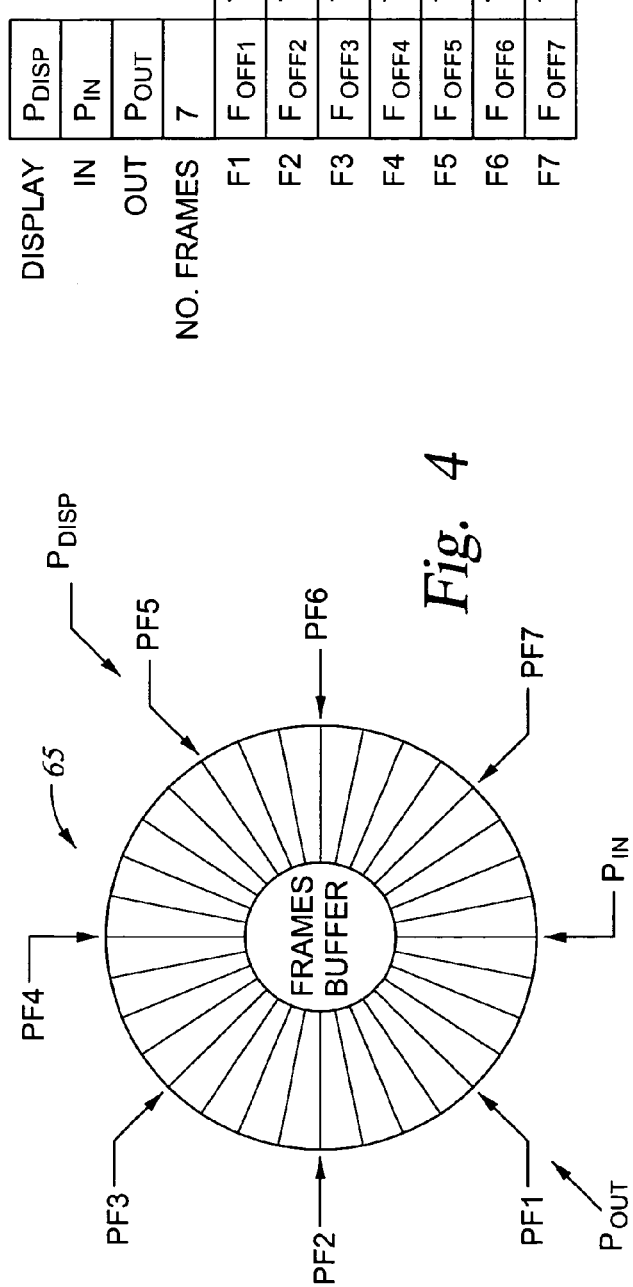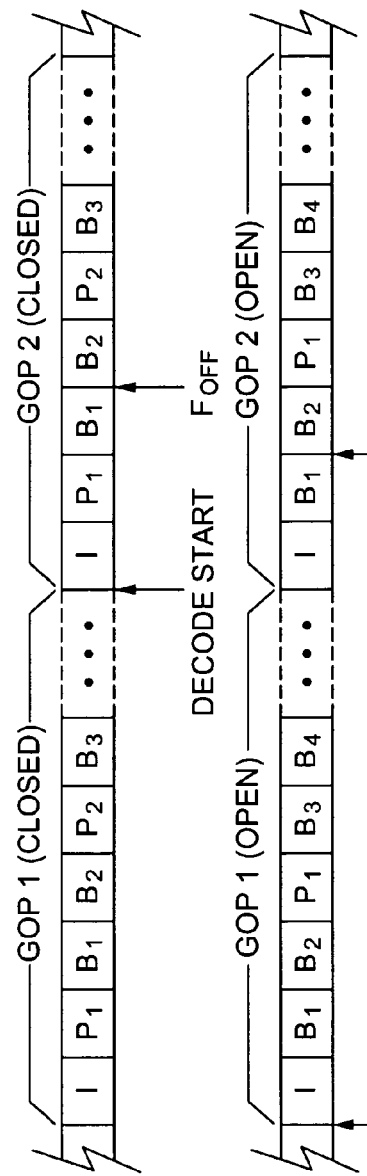

| Control Protocol | |
|---|---|
| | Configuration.<br>Allows the data mover to determine the configuration of the decoder array and set up any configuration parameters.<br>Commands: QueryStatus, Configure |
| | Streaming.<br>Controls delivery of streams (i.e., timing, clips, transition type).<br>Commands: PrerollClip, ModifyDisplayTime, CancelClipPreroll, PauseClip, ResumeClip, ModifyClip. |
| | Asynchronous status reports.<br>Asynchronous reports of significant events from the decoder array to the data mover.<br>Commands: ClipHasStarted, ClipHasEnded, ClipIsEnding, TrapMessage, EditSummary. |
| | Edit.<br>Allows all decoders in the decoder array to be controlled by an edit review station.<br>Commands: Jog forward/backward, Shuttle forward/backward, Stop, Goto a specific timecode, and normal Play. |

*Fig. 16*

Data Message Header Format

| Data message number |
|---|
| Clip ID Number |
| Sequence Number |
| offset |
| 0x00    0x00    data length |
| flags    RESERVED |
| RESERVED |
| RESERVED |

*Fig. 19*

Request Message Header Format

| Request message number |
|---|
| Clip ID Number |
| Sequence Number |
| byte offset |
| window size |
| state \| Reserved \| speed |
| RESERVED |
| RESERVED |

*Fig. 18*

Definition of Streaming States

| Streaming State | Definition |
|---|---|
| Cueing | Data mover sends data to the decoder, at least up to the time code that must be displayed. The data rate can be at a rate convenient for the data mover. The decoder consumes the data at 1 x real time. It is not important if the decoder underflows, since the underflow would be before the display time. |
| Streaming | The data mover sends data to the decoder at 1 x real time and the decoder consumes the data at 1 x real time; the decoder can underflow/overflow and it will affect the picture presented to the viewer. |
| Stopped | The decoder is not consuming data. During this state, the decoder continues to send Request messages at the configured Request interval. |
| non-overlapped | This state requires that the decoder send a new Request message only after receiving a response from the previous Request message. The data mover may use this mode for testing. |

*Fig. 25*

MPEG DUAL-CHANNEL DECODER DATA AND CONTROL PROTOCOLS FOR REAL-TIME VIDEO STREAMING

LIMITED COPYRIGHT WAIVER

A portion of the disclosure of this patent document contains computer commands and listings to which the claim of copyright protection is made. The copyright owner has no objection to the facsimile reproduction by any person of the patent document or the patent disclosure, as it appears in the U.S. Patent and Trademark Office patent file or records, but reserves all other rights whatsoever.

BACKGROUND OF THE INVENTION

1. Field of the Invention

The present invention relates to storage and processing of compressed visual data, and in particular the decoding of MPEG data for real-time splicing and streaming of video from storage in a video server.

2. Background Art

It has become common practice to compress audio/visual data in order to reduce the capacity and bandwidth requirements for storage and transmission. One of the most popular audio/video compression techniques is MPEG. MPEG is an acronym for the Moving Picture Experts Group, which was set up by the International Standards Organization (ISO) to work on compression. MPEG provides a number of different variations (MPEG-1, MPEG-2, etc.) to suit different bandwidth and quality constraints. MPEG-2, for example, is especially suited to the storage and transmission of broadcast quality television programs.

For the video data, MPEG provides a high degree of compression (up to 200:1) by encoding 8×8 blocks of pixels into a set of discrete cosine transform (DCT) coefficients, quantizing and encoding the coefficients, and using motion compensation techniques to encode most video frames as predictions from or between other frames. In particular, the encoded MPEG video stream is comprised of a series of groups of pictures (GOPs), and each GOP begins with an independently encoded (intra) I frame and may include one or more following P-frames and B-frames. Each I frame can be decoded without information from any preceding and/or following frame. Decoding of a P frame requires information from a preceding frame in the GOP. Decoding of a B frame requires information from a preceding and following frame in the GOP. To minimize decoder buffer requirements, each B frame is transmitted in reverse of its presentation order, so that all the information of the other frames required for decoding the B frame will arrive at the decoder before the B frame.

In addition to the motion compensation techniques for video compression, the MPEG standard provides a generic framework for combining one or more elementary streams of digital video and audio, as well as system data, into single or multiple program transport streams (TS) which are suitable for storage or transmission. The system data includes information about synchronization, random access, management of buffers to prevent overflow and underflow, and time stamps for video frames and audio packetized elementary stream packets. The standard specifies the organization of the elementary streams and the transport streams, and imposes constraints to enable synchronized decoding from the audio and video decoding buffers under various conditions.

The MPEG-2 standard is documented in ISO/IEC International Standard (IS) 13818-1, "Information Technology-Generic Coding of Moving Pictures and Associated Audio Information: Systems," ISO/IEC IS 13818-2, "Information Technology-Generic Coding of Moving Pictures and Associated Information: Video," and ISO/IEC IS 13818-3, "Information Technology-Generic Coding of Moving Pictures and Associated Audio Information: Audio," incorporated herein by reference. A concise introduction to MPEG is given in "A guide to MPEG Fundamentals and Protocol Analysis (Including DVB and ATSC)," Tektronix Inc., 1997, incorporated herein by reference.

Splicing of audio/visual programs is a common operation performed, for example, whenever one encoded television program is switched to another. Splicing may be done for commercial insertion, studio routing, camera switching, and program editing. The splicing of MPEG encoded audio/visual streams, however, is considerably more difficult than splicing of the uncompressed audio and video. The P and B frames cannot be decoded without a preceding I frame, so that cutting into a stream after an I frame renders the P and B frames meaningless. The P and B frames are considerably smaller than the I frames, so that the frame boundaries are not evenly spaced and must be dynamically synchronized between the two streams at the time of the splice. Moreover, because a video decoder buffer is required to compensate for the uneven spacing of the frame boundaries in the encoded streams, splicing may cause underflow or overflow of the video decoder buffer.

The problems of splicing MPEG encoded audio/visual streams are addressed to some extent in Appendix K, entitled "Splicing Transport Streams," to the MPEG-2 standard ISO/IEC 13818-1 1996. Appendix K recognizes that a splice can be "seamless" when it does not result in a decoding discontinuity, or a splice can be "non-seamless" when it results in a decoding discontinuity. In either case, however, it is possible that the spliced stream will cause buffer overflow.

The Society of Motion Picture and Television Engineers (SMPTE) apparently thought that the ISO MPEG-2 standard was inadequate with respect to splicing. They promulgated their own SMPTE Standard 312M, entitled "Splice Points for MPEG-2 Transport Streams," incorporated herein by reference. The SMPTE standard defines constraints on the encoding of and syntax for MPEG-2 transport streams such that they may be spliced without modifying the packetized elementary stream (PES) packet payload. The SMPTE standard includes some constraints applicable to both seamless and non-seamless splicing, and other constraints that are applicable only to seamless splicing. For example, for seamless and non-seamless splicing, a splice occurs from an Out-point on a first stream to an In-point on a second stream. The Out-point is immediately after an I frame or P frame (in presentation order). The In-point is just before a sequence header and I frame in a "closed" GOP (i.e., no prediction is allowed back before the In-point).

As further discussed in Norm Hurst and Katie Cornog, "MPEG Splicing: A New Standard for Television—SMPTE 312M," SMPTE Journal, November 1998, there are two buffering constraints for seamless splicing. The startup delay at the In-point must be a particular value, and the ending delay at the Out-point must be one frame less than that. Also, the old stream must be constructed so that the video decoder buffer (VBV buffer) would not overflow if the bit rate were suddenly increased to a maximum splice rate for a period of a splice decoding delay before each Out-point.

In the broadcast environment, frame accuracy is an important consideration whenever audio or digital video streams are spliced. If frame accuracy is not ensured, then desired frames will be missing from the spliced video stream, and undesired frames will appear in the spliced video stream. If frame inaccuracy accumulates, there could be serious schedule problems. The loss or addition of one or more frames is especially troublesome when commercials are inserted into program streams. Each commercial is a very short clip and the loss or addition of just a few frames can have a noticeable effect on the content of the commercial. More importantly, the loss or addition of just a few frames may result in a substantial loss of income from advertisers, because advertisers are charged a high price for each second of on-air commercial time.

In order to ensure frame accuracy in the broadcast environment, it is common practice to include a vertical interval time code (VITC) in the analog video waveform to identify each video field and frame or to use an external LTC (Longitudinal Time Code) synchronized to a house clock. The VITC occurs on a scan line during each vertical blanking interval. For digital video, each VITC can be digitized to provide a digital vertical interval time code (DVITC) for each video field and frame. The VITC and DVITC are used when the video source is a VTR. LTC is used when the video source is a satellite feed. For example, for a 525 line video system, each VITC can be digitized to an eight-bit value in accordance with SMPTE standard 266M-1994. Splicing operations can be triggered upon the occurrence of a specified VITC or DVITC value in an analog or digital video stream or from LTC input.

Video streams are often encoded in the MPEG-2 format for storage in a video server. In digital broadcast plants the server streams in real time an MPEG-2 Transport Stream (TS) with long GOP structures generally to a professional grade MPEG-2 decoder. The decoder decodes the compressed MPEG-2 TS to video and audio in sequence as defined by the presentation time stamps (PTS) and display time stamps (DTS) in the video elementary streams and presentation time stamps (PTS) in the audio elementary streams. As the decoder receives compressed data it must decode the compressed data conforming to the MPEG-2 standard starting with an I frame and ending on the last frame of the last GOP. But this decoding process is not necessarily frame accurate. To achieve frame accuracy, the decoder must be able to start on any frame other than the I frame.

SUMMARY OF THE INVENTION

In accordance with one aspect of the invention, there is provided a method of producing a real-time video stream from stored MPEG encoded video clips. The MPEG encoded video clips are contained in data storage of a video server. The method includes reading segments of the MPEG encoded video clips from the data storage. The segments of the MPEG encoded video clips are decoded by respective first and second decoders in a decoder pair. The first decoder decodes at least a portion of a first MPEG encoded video clip, and the second decoder decodes at least a portion of a second MPEG encoded video clip. The real-time video stream is obtained by operating a video switch to switch between a video output of the first decoder and a video output of the second decoder to select a specified In-point frame in the second MPEG encoded video clip that is selectable as any MPEG frame type at any location in an MPEG group of pictures (GOP) structure.

In accordance with another aspect, the invention provides a method of producing a real-time video stream from stored MPEG-2 encoded video clips. The MPEG-2 encoded video clips are contained in data storage of a video file server. Segments of the MPEG-2 encoded video clips are decoded by respective first and second decoders in a decoder pair. The first decoder decodes at least a portion of a first MPEG-2 encoded video clip, and the second decoder decodes at least a portion of a second MPEG-2 encoded video clip. The real-time video stream is obtained by operating a video switch to switch between a video output of the first decoder and a video output of the second decoder at an occurrence of a specified time code to select a specified In-point frame in the second MPEG-2 encoded video clip that is selectable as any MPEG-2 frame type at any location in an MPEG-2 group of pictures (GOP) structure. The decoders and the video switch are operated in response to control commands from the video server. The control commands include streaming commands used to control the In-point of the second MPEG-2 encoded video clip included in the real-time video stream. The decoders request and obtain the MPEG-encoded data of the first and second MPEG-2 encoded video clips from the video server.

In accordance with another aspect, the invention provides a system for producing multiple concurrent real-time video streams from stored MPEG encoded video clips. The system includes a video server having data storage containing the MPEG encoded video clips, and at least one MPEG decoder array linked to the video server for receiving control commands and data from the video server. The decoder array includes multiple decoder pairs. Each decoder pair has a video switch for switching from a video output of one decoder in the decoder pair to a video output of the other decoder in the decoder pair at an occurrence of a specified time code. The video server and the decoder array are programmed for switching each video switch for selecting a specified In-point frame that is selectable as any MPEG frame type at any location in an MPEG group of pictures (GOP) structure. The video server and the decoder array are programmed for the video server to control the decoder array by sending control commands from the video server to the decoder array. The video server and the decoder array are also programmed for each decoder to request and obtain MPEG-encoded data from the video server.

In accordance with another aspect, the invention provides a system for producing multiple concurrent real-time video streams from MPEG encoded video clips. The system includes a video server for storing the MPEG encoded video clips, and at least one MPEG decoder array coupled to the video server for producing the multiple concurrent real-time video streams from the MPEG encoded video clips stored in the video server. The video server includes cached disk storage for storing the MPEG encoded video clips, multiple data mover computers coupled to the cached disk storage for streaming segments of the MPEG encoded video clips from the cached disk storage to the MPEG decoder array, and a controller server computer coupled to the data mover computers for controlling the data mover computers. The decoder array includes a respective decoder pair and a respective video switch for each of the multiple concurrent real-time video streams. The video switch selects a video output from either one of the decoders in the decoder pair for production of each of the multiple concurrent real-time video streams by switching from the video output from one of the decoders in the decoder pair to a specified In-point frame in the video output from the other of the decoders in the decoder pair. In-point frame is selectable as any frame and any frame type in a group of pictures (GOP) structure of the MPEG encoded video. The decoders in the decoder pair are coupled to a respective one of the data mover computers for receiving segments of the MPEG encoded video clips for the production of each of the multiple concurrent real-time video streams.

In accordance with still another aspect, the invention provides a system for producing multiple concurrent real-time video streams from MPEG-2 encoded video clips. The system includes a video server for storing the MPEG-2 encoded video clips, and at least one MPEG-2 decoder array coupled to the video server for producing the multiple concurrent real-time video streams from segments of the MPEG-2 encoded video clips stored in the video server. The system also includes an operator control station coupled to the video server for transmitting a play list and edit commands from an operator to the video server for controlling and editing content of the multiple concurrent real-time video streams. The video server includes cached disk storage for storing the MPEG-2 encoded video clips, multiple data mover computers coupled to the cached disk storage for streaming the segments of the MPEG-2 encoded video clips from the cached disk storage to the MPEG-2 decoder array, and a controller server computer coupled to the data mover computers for controlling the data mover computers in response to the play list and edit commands from the operator control station. The decoder array includes a respective decoder pair and a respective video switch for each of the multiple concurrent real-time video streams. The video switch selects a video output from either one of the decoders in the decoder pair for production of the respective real-time video stream by switching from the video output from one of the decoders in the decoder pair to a specified In-point frame in the video output from the other of the decoders in the decoder pair. The In-point frame is selectable as any frame and any frame type in a group of pictures (GOP) structure of the MPEG-2 encoded video. The decoders in the decoder pair are coupled to a respective one of the data mover computers for receiving segments of the MPEG-2 encoded video clips for the production of the respective real-time video stream. The decoder array further includes a decoder controller coupled to the decoders and the video switches for controlling the decoders and the video switches. The decoder controller is coupled to at least one of the data mover computers for receiving control commands for the production of the multiple concurrent real-time video streams. The control commands include configuration commands to allow the video server to determine a configuration of the decoder array and to set up configuration parameters, streaming commands to control the In-points of the MPEG-2 video clips included in each of the multiple concurrent real-time video streams, asynchronous status reports of significant events from the decoder array; and edit commands to allow the decoders in the decoder array to be controlled for editing content of the multiple concurrent real-time video streams. Moreover, the respective data mover computer for each decoder pair is programmed to prepare for switching from the video output from one of the decoders in the decoder pair to a specified In-point frame in the video output from the other of the decoders in the decoder pair by initiating a stream of MPEG-2 encoded data from the respective data mover computer to the other of the decoders in the decoder pair in response to a request from the other of the decoders in the decoder pair. The system further includes a house clock generator coupled to the video server and the MPEG-2 decoder array for switching to the specified In-point frames when the house clock generator provides respective specified time code values.

BRIEF DESCRIPTION OF THE DRAWINGS

Other objects and advantages of the invention will become apparent upon reading the detailed description with reference to the drawings, in which:

FIG. 4 is a schematic diagram of one of the frames buffer used in each decoder;

FIG. 5 is a schematic diagram of a data structure for various pointers used in connection with the frames buffer of FIG. 4;

FIG. 6 shows an MPEG Transport Stream including a series of closed groups of pictures (GOPs) and showing a decode start position for a particular frame offset of a frame to be decoded;

FIG. 7 shows an MPEG Transport Stream including a series of open GOPs and showing a decode start position for a particular frame offset of a frame to be decoded;

FIG. 16 is a table of various commands in a control protocol used by the controller server for controlling the decoder array in the system of FIG. 1;

FIG. 18 is a diagram showing a request message header format for an Ethernet packet;

FIG. 19 shows a data message header format for an Ethernet packet;

FIG. 25 is a table showing definitions of streaming states; and

Figure 1:
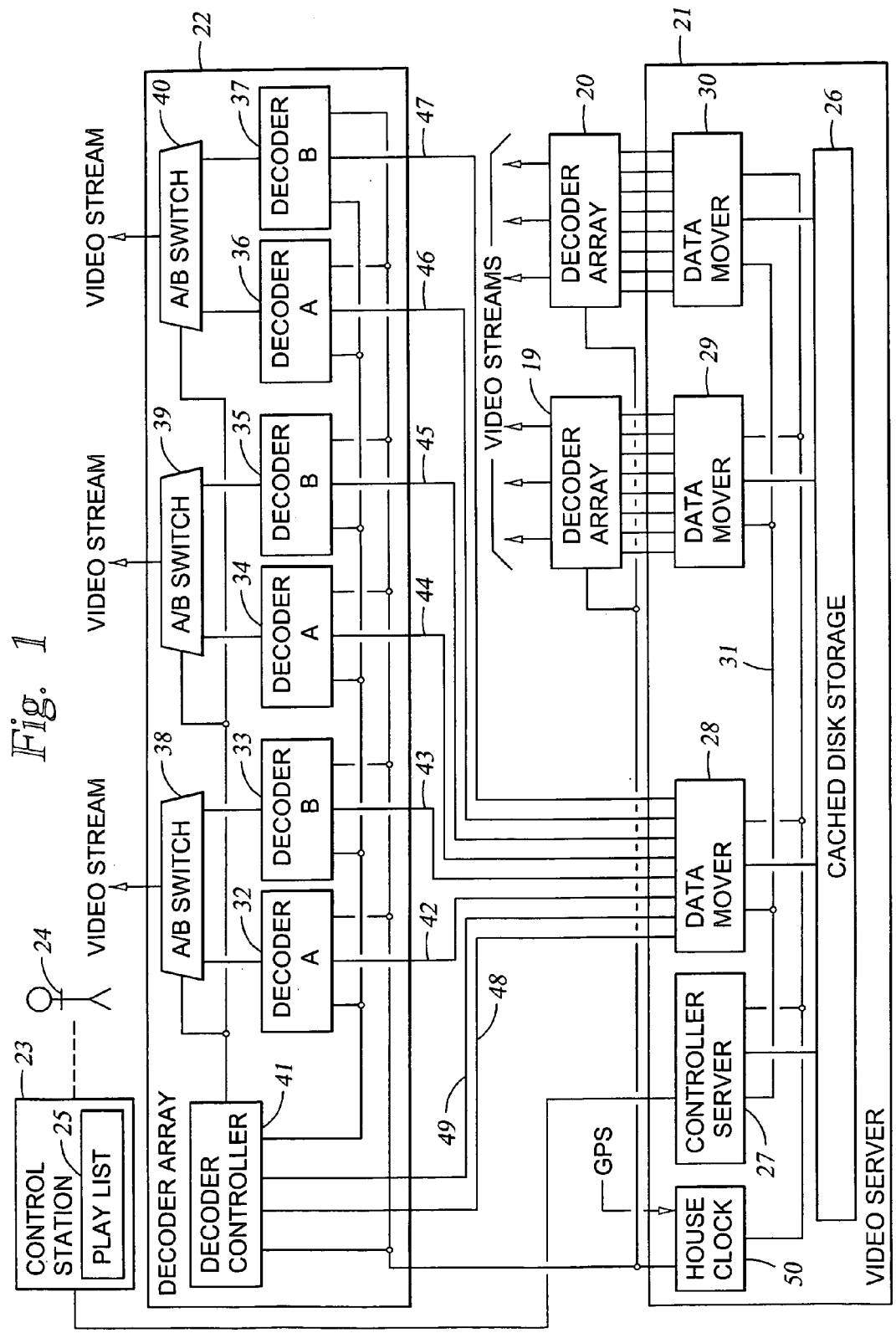
FIG. 1 is a block diagram of a video system for delivering real-time video streams in accordance with an aspect of the present invention.

While the invention is susceptible to various modifications and alternative forms, a specific embodiment thereof has been shown by way of example in the drawings and will be described in detail. It should be understood, however, that it is not intended to limit the form of the invention to the particular form shown, but on the contrary, the intention is to cover all modifications, equivalents, and alternatives falling within the scope of the invention as defined by the appended claims.

DESCRIPTION OF ILLUSTRATIVE EMBODIMENTS

With reference to FIG. 1, there is shown a system for play out and real-time decoding of recorded MPEG-2 video data. The system includes a video server 21 storing MPEG-2 encoded video data, several decoder arrays 19, 20, 22 for decoding the MPEG-2 encoded video data to produce a number of real-time video streams, and a control station 23 managed by an operator 24. The operator 24, for example, enters and edits a play list 25 specifying a sequence of video clips to be included in each video stream, and a time code (TC) at which each video clip is to begin.

The video server 21 is a storage system for storing the video clips, each of which is a segment from an MPEG-2 Transport Stream (TS). Each clip includes a series of complete and contiguous groups of pictures (GOPs) in the MPEG-2 Transport Stream. A suitable video server 21 is described in Duso et al. U.S. Pat. No. 5,892,915 issued Apr. 6, 1999, incorporated herein by reference. This kind of video server 21 is manufactured and sold by EMC Corporation, 35 Parkwood Dr., Hopkinton, Mass. 01748.

The video server 21 includes a cached disk storage subsystem 26 for storing the MPEG-2 encoded video clips, at least one controller server 27, and a plurality of data mover computers 28, 29, and 30 for streaming the Transport Streams of the video clips. The clustering of the data movers 28, 29, 30 as a front end to the cached disk storage subsystem 26 provides parallelism and scalability. Each of the data movers 28, 29, 30 is a high-end commodity computer, providing the highest performance appropriate for a data mover at the lowest cost. The data movers may communicate with each other and with the controller server 27 over a dedicated dual-redundant Ethernet connection 31. The controller server 27 also has a data link to the control station 23. The controller server 27 is a high-end commodity computer, and the control station 23 is a low-end commodity computer, such as a laptop computer.

Each of the decoder arrays 19, 20, 22 includes a plurality of MPEG-2 decoders 32, 33, 34, 35, 36, 37, video stream switches 38, 39, 40, and a decoder controller 41. The MPEG-2 decoders are arranged in pairs and each pair is associated with a respective video stream switch 38, 39, 40 so that each video stream switch selects the video stream output of one (designated "A") or the other (designated "B") of the decoders in the decoder pair associated with the video switch.

As shown in FIG. 1, each decoder in each decoder pair in the decoder array 22 has a data port for a data streaming link 42, 43, 44, 45, 46, 47 to a respective port in the data mover 28 for the pair. This data streaming link, for example, is a bi-directional Ethernet link providing communications via the User Datagram Protocol (UDP). The respective data mover sends data to the decoder and the decoder flow controls the data by using disconnects to control the data rate. The decoder controller 41 has a control port for a bi-directional Ethernet link 48 to the data mover 28 using UDP. The controller server 27 sends decoder control requests over the link 31 to the data mover 28 which sends the commands over the link 48 to the decoder controller 41, and the decoder controller returns command responses over the link 48 to the data mover 28. The decoder controller 41 also has an asynchronous port for a bi-directional Ethernet link 49 to the data mover computer 28 using UDP. The decoder controller sends asynchronous status reports and edit messages over the link 49 to the data mover computer 28.

It is desired to control the decoder array 22 in such a way that a real-time video stream is produced by seamless splicing of clips, and the spliced video stream is frame accurate and time accurate. In other words, the In-point and Out-point of the splice can be freely selected, independent of the positions of the In-point and Out-point in the GOP structure of the MPEG encoded clips. Under these conditions, the video stream can be precisely specified by a play list 25 including, for each entry in the play list, a specification of a clip (e.g., a clip ID), a specification of a particular frame in the clip (e.g., a frame offset), and a starting time code for each clip (e.g., $TC_{IN}$).

In order to achieve these objectives, each decoder in the decoder array 22 has a large frames buffer (shown in FIG. 4 and described further below) of decompressed video frames and pointers in the buffer that will allow the decoder to display any frame regardless of its MPEG type (I, B or P). During the play-out of a clip from one decoder in a decoder pair, the other decoder in the pair can be prepared for the display of a specified frame of a next clip at a specified time. When the specified time occurs, the video switch of the decoder pair is toggled so that the video stream from the video switch displays the specified frame of the next clip at the specified time.

Each of the decoder arrays 19, 20 has a construction and operation similar to the construction and operation of the decoder array 22. The decoder array 19 is linked to the data mover 29 for the exchange of control requests, data, asynchronous status reports and edit messages for the production of multiple concurrent video streams from MPEG-2 encoded data from the data mover 29. The decoder array 20 is linked to the data mover 30 for the exchange of control requests, data, asynchronous status reports and edit messages for the production of multiple concurrent video streams from MPEG-2 encoded data from the data mover 30.

It is also desired to permit the segments of the clips in the spliced video stream to be very short, and to permit a new clip to be added to the play list a very short time before the new clip is spliced into the video stream. To achieve this objective, each decoder has the capability of operating faster than real-time when the decoder is being prepared for the display of a specified frame of a new clip at a specified time. Moreover, a house clock generator 50, synchronized to a global positioning system (GPS) clock signal, produces a common time base that is shared between the decoder array 22 and the video server 21. Changes to the play list 25 can be evaluated by the controller server 27 with reference to the house clock signal to schedule a data mover for the streaming of MPEG-2 coded video for a new clip from the cached disk storage 26 to one decoder in a decoder pair concurrent with the play-out of the current clip and just after the streaming of MPEG-2 coded video of the current clip to the other decoder in the decoder pair.

It is also desired to provide a control protocol used by the data mover computer 28 for controlling the decoder controller 41 and a data protocol used by the data mover 28 for streaming of MPEG-2 coded data to the decoder pairs of the decoder array. The play list 25 and edit requests to the play list 25 from the operator 24 at the control system are evaluated by the controller server on an admissions control basis and either rejected as untimely or accepted and converted into appropriate control commands to the data mover 28 and from there transmitted to the decoder controller 41 with substantial certainty that the control commands will be executed in time to produce a properly spliced video stream as specified by the play list. In other words, the controller server 27 has a kind of feed forward control model of the requirements and capabilities of the data movers and decoders for execution of the commands in the control protocol and the data protocol. This feed forward control model provides the controller server 27 with the ability to determine whether or not the data mover and decoder operations can be scheduled in time in accordance with the play list and play list edits, and if so, to schedule them by forwarding appropriate commands to the data mover 28 and indirectly to the decoder controller 41.

In a preferred implementation, the protocols are exported to the decoder controller 41 and the decoders 32, 33, 34, 35, 36, 37 with A/B switch on TC capability to allow the frame accuracy in time and space. The video server 21 starts the operation of a selected one of the decoders and then the decoder requests the MPEG TS data from the respective data mover at a rate that will allow the decoder to decode the data. Each operation of stream start or switch is based on a TC and offset request from the video server as well as the preparation of the decoder that is off-air while the other decoder in the decoder pair is on air. In all cases there is a single channel of MPEG TS data streaming from the video server to the decoder pair.

Figure 2:
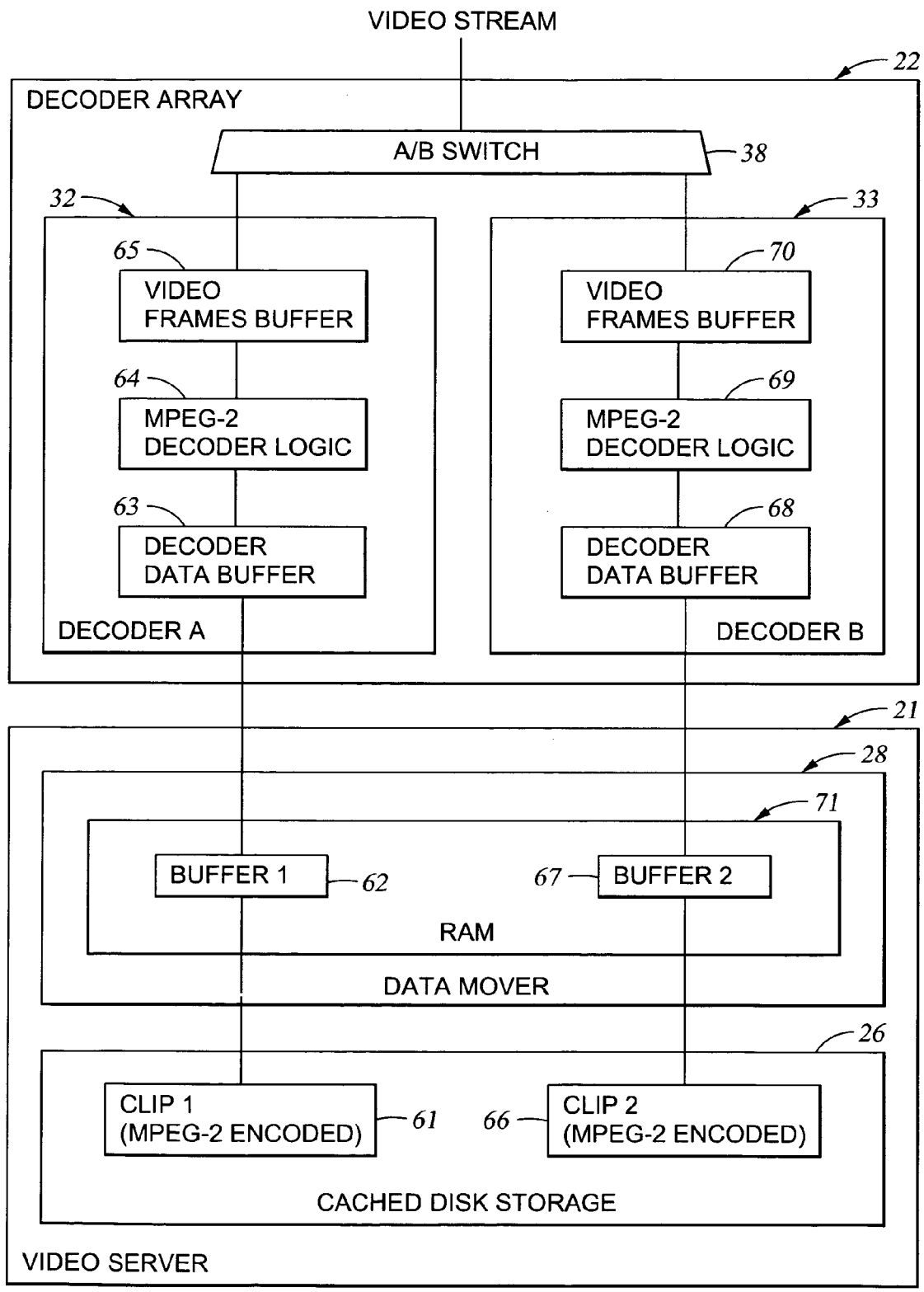
FIG. 2 is a block diagram of a portion of the system of FIG. 1 showing in more detail the construction of the decoders.

With reference to FIG. 2, there are shown the data paths from cached disk storage 26 in the video server 21 to a video stream from the decoder array 22. A first clip of MPEG-2 encoded video data 61 is contained in the cached disk storage 26. The data mover 28 fetches blocks of data from the first clip 61 and stores them in a random access memory buffer 62 in the data mover 28. The decoder 32 includes a decoder data buffer 63 for storing MPEG-2 encoded video data, MPEG-2 decoder logic 64 for decoding the MPEG-2 encoded video data, and a video frames buffer 65 for storing frames of video data. The decoder 32 fetches the blocks of data from the buffer 62 in the data mover 28 and stores them in the decoder data buffer 63. The MPEG-2 decoder logic 64 decodes the blocks of data in the decoder data buffer 63 to produce frames of video data and stores the frames of video data in the video frames buffer 65. Data of a video frame having a current time code is presented in real-time to the A/B switch 38, and when the A/B switch is in the "A" channel selected state, the A/B switch outputs the real-time video stream from the decoder 32. In a similar fashion, FIG. 2 shows a "B" channel data path including a second clip 66 in cached disk storage 26, a buffer 67 in the data mover 28, a decoder data buffer 68 in the decoder 33, MEPG-2 decoder logic 69 in the decoder 33, and a video frames buffer 70. The buffer 62 and the buffer 67 share random access memory 71 in the data mover 28, and generally speaking, when the buffer 62 is substantially full, the buffer 67 is substantially empty.

Figure 3:
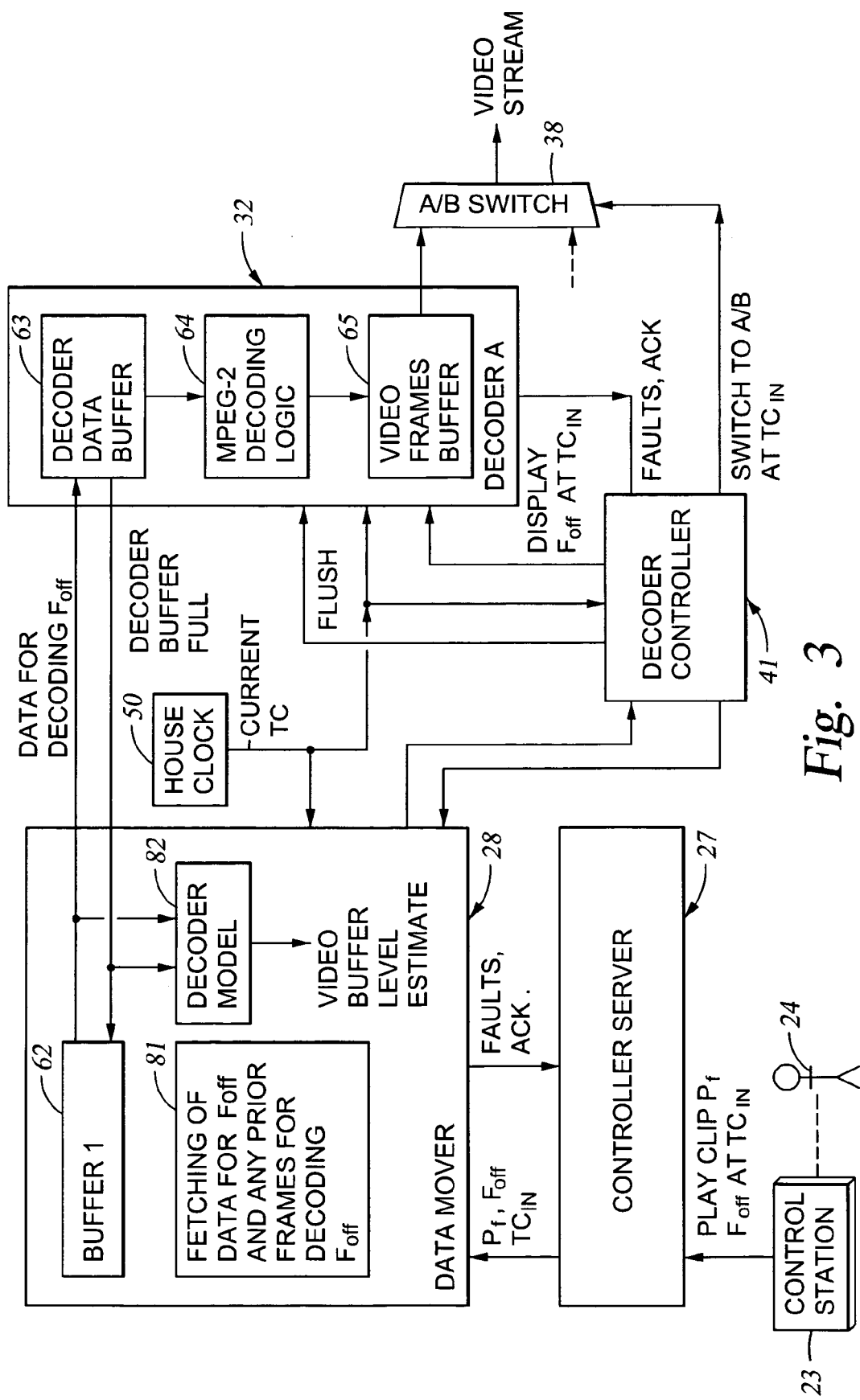
FIG. 3 is a block diagram showing various control signals used in the system of FIG. 1.

With reference to FIG. 3, there are shown various control paths in the system of FIG. 1. In effect, the control station 23 issues a series of requests to the controller server 27 of the form "play clip $P_f$ starting with frame $F_{off}$ at time $TC_{IN}$."

The controller server 27 sends the command to a data mover such as the data mover 28 which responds by comparing the specified time code $TC_{IN}$ to the current time code TC from the house clock 50 to see if the specified time code $TC_{IN}$ is prior in time by a predetermined threshold. If so, the data mover 28 forwards the request to a selected one of the decoder pair from which the video stream is to issue. The data mover 28 then executes a routine 81 for fetching, from the cached disk storage (26 in FIG. 1), MPEG-2 encoded data for the specified frame $F_{off}$ of the specified clip $P_f$ and any prior frames needed for decoding the specified frame $F_{off}$. By executing the routine 81, the data mover 28 obtains more precise information as to when the decoder 32 can decode the specified frame $F_{off}$, and if the data mover 28 determines that the decoder can decode the specified frame by the specified time $TC_{IN}$, then the data mover returns an acknowledgement to the controller server 27. The data mover 28 then sends a display request to the decoder 32. The decoder 32 responds by performing a "pre-roll" operation that includes the fetching of the MPEG-2 encoded video from the buffer 62 in the data mover 28 to the decoder data buffer 63, and decoding the encoded video up to the specified frame $F_{off}$. The data mover 28 monitors the "pre-roll" operation by applying a decoder model 82 to the information exchanged between the decoder data buffer 63 and the data mover buffer 62 to compute a video buffer level estimate, and to conclude that the "pre-roll" operation is progressing properly so long as the video buffer level estimate is within specified limits for the decoder 32. When the current time code TC from the house clock 50 matches the specified time code $TC_{IN}$, the video frames buffer 65 outputs video data for the specified frame, and the decoder controller 41 switches the A/B switch 38 to select the video stream from the specified frame $F_{off}$ in the frames buffer. The decoder 32 continues to fetch and decode MPEG-2 encoded video data for the specified clip $P_f$ until the data mover 28 sends a flush command to the decoder.

FIG. 4 shows the frames buffer 65. The buffer is logically organized as a circular FIFO buffer. In other words, the buffer pointer is incremented or decremented in a modulo-N fashion, where N is the number of pointer addresses of random access memory in the buffer. The addresses PF1, PF2, PF3, PF4, PF5, PF6, and PF7 designate the starting addresses of respective video frames. The pointer value $P_{out}$ indicates the starting address of the last frame written into the buffer and to be read out of the buffer. A pointer value $P_{in}$, indicates a "free" address where writing into the buffer can begin. If $P_{in} = P_{out}$ the buffer is empty. The buffer is full if $P_{in} = P_{out} - 1$. If the buffer is not full, video data can be written to the address $P_{in}$, and then $P_{in}$ is incremented. If the buffer is not empty, video data can be read from the address $P_{out}$ for display, and then $P_{out}$ is typically decremented, unless it is desired to keep the frame in the frames buffer, for example, is during a pause or freeze frame operation. A separate display pointer $P_{DISP}$ can be used for display operations where it is desired to keep the video data in the buffer. To flush the entire video frames buffer, the pointer value $P_{in}$, is set equal to the pointer value $P_{out}$.

FIG. 5 shows data structures associated with the frames buffer. The frame pointers are arranged as a list including the number of frames in the list. In addition to a frame pointer, there is a frame offset ($F_{OFF1}, F_{OFF2}, F_{OFF3}, \ldots$) associated with each frame in the buffer. In addition, there may be a specified time code (TC1, TC2, TC3, . . . ) associated with each frame in the frame in the buffer. If there is a time code associated with a frame in the frame buffer, then the frame will remain in the frames buffer until the current time code becomes equal to the specified time code unless the frame is flushed from the frames buffer in response to a command from the decoder controller 41.

As introduced above with respect to the data mover routine 81 in FIG. 3, in order for a specified frame $F_{OFF}$ to be decoded, it may be necessary for the decoder to decode a number of frames preceding the frame $F_{OFF}$ in the MPEG-2 Transport Stream. If the specified frame $F_{OFF}$ is found in a closed GOP as shown in FIG. 6, then the decoder must decode the I frame of the closed GOP in order to display the specified frame $F_{OFF}$. If the specified frame $F_{OFF}$ is found in an open GOP and the specified frame is a "B" frame that references a frame in a preceding GOP, as shown in FIG. 7, then the decoder must decode the I frame of the preceding GOP.

Figure 8:
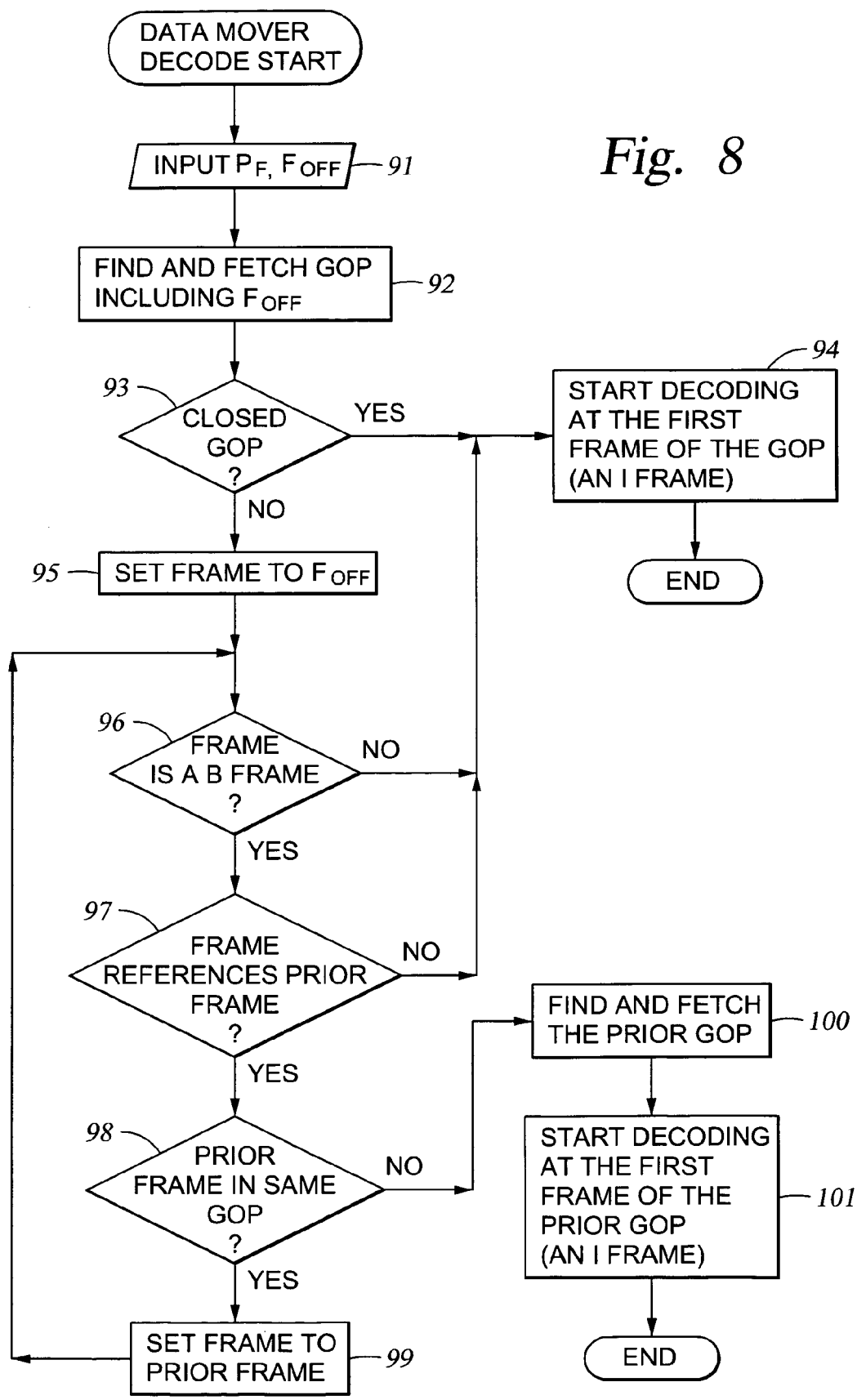
FIG. 8 is a flow chart of a procedure used by a data mover to determine the decode start position in an MPEG Transport Stream for a given frame offset of a frame to be decoded.

FIG. 8 is a flowchart of a procedure executed by a data mover to determine the frames that must be fetched for decoding of the specified frame $F_{OFF}$. In a first step 91, the data mover receives the clip ID ($P_f$) and the frame specification $F_{OFF}$. In step 92 the data mover finds and fetches the GOP including the specified frame $F_{OFF}$. In step 93, if is the GOP is a closed GOP (as indicated by a CLOSED_GOP flag in the GOP header), then execution branches to step 94 to start decoding at the first frame (the I frame) of the GOP.

In step 93, if the GOP is not a closed GOP, then execution continues to step 95 to determine whether or not the specified frame $F_{OFF}$ references a frame in a prior GOP. In step 95, a frame pointer is set to the frame offset $F_{OFF}$. In step 96, if the frame is not a B frame, then the GOP structure is such that the frame will not reference a frame in a prior GOP, and execution branches to step 94. In step 96, if the frame is a B frame, execution continues to step 97 to examine the B frame to determine whether it references a prior frame. If the B frame does not reference a prior frame, then execution branches from step 97 to step 94. In step 97, if the B frame references a prior frame, then execution continues to step 98. In step 98, if the prior frame is not in the same GOP, then execution branches to step 100 to find and fetch the prior GOP, and in step 101, decoding is started at the first frame (the I frame) of the prior GOP.

In step 98, if the prior frame is in the same GOP, then execution continues to step 99 to set the frame pointer to the prior frame. Execution loops back from step 99 to step 96 to continue the backward search to determine whether there is an indirect reference to a frame in a prior GOP.

Figure 9:
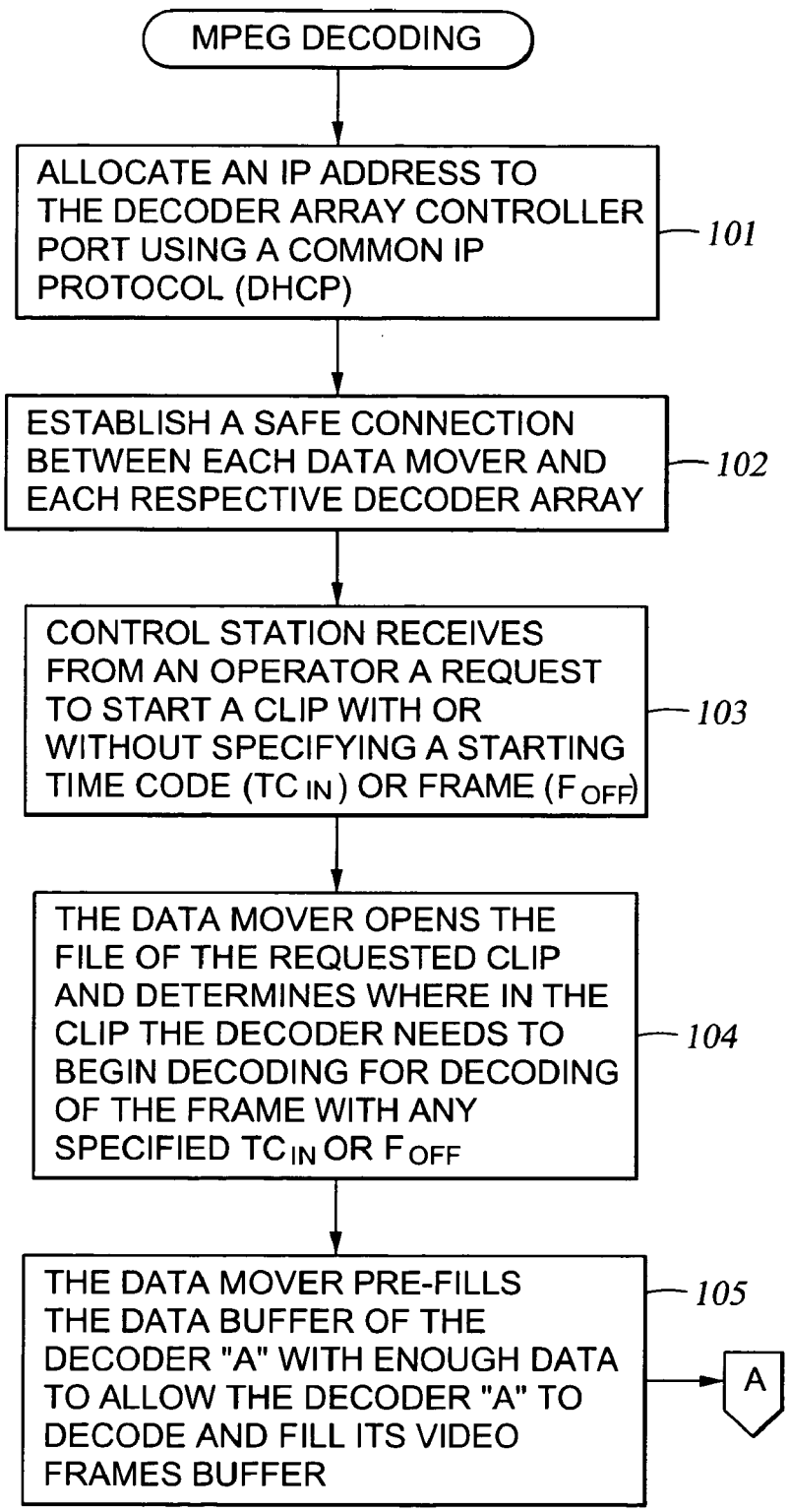
FIG. 9 is a first sheet of a flow chart of the operation of the system of FIG. 1 to produce real-time video streams from MPEG-2 encoded data stored in the video server of FIG. 1.

FIG. 9 is the first sheet of a flowchart showing how the video system in FIG. 1 uses the decoder control protocol and the decoder data protocol to achieve frame accurate decoding and splicing of MPEG-2 encoded clips. In a first step 101, the data mover computer of the video server allocates an IP address to the decoder array controller port (for link 48 in FIG. 1, for example) using a common IP protocol such as DHCP. In step 102, the data mover establishes a safe connection with each decoder array that is directly linked to the data mover. In step 103, the control station receives from the operator a request to start a specified clip with or without specifying a $TC_{IN}$ or frame offset $F_{OFF}$ at which the clip is to be started. Unless otherwise specified, the display of the clip will begin at the first frame in the clip in display order as soon as the first frame is decoded. In step 104, the data mover opens the requested file and determines where in the clip the decoder needs to begin decoding for decoding of the frame with any specified $TC_{IN}$ or frame offset $F_{OFF}$. If a particular frame is not specified, decoding begins with the first frame in the clip. In step 105, the data mover pre-fills the data buffer of the decoder "A" with enough data to allow the decoder "A" to decode and fill its video frames buffer. In step 105, the data mover pre-fills the data buffer of the decoder "A" with enough data to allow the decoder "A" to decode and fill its video frames buffer. Execution continues from step 105 to step 106 in FIG. 10.

Figure 10:
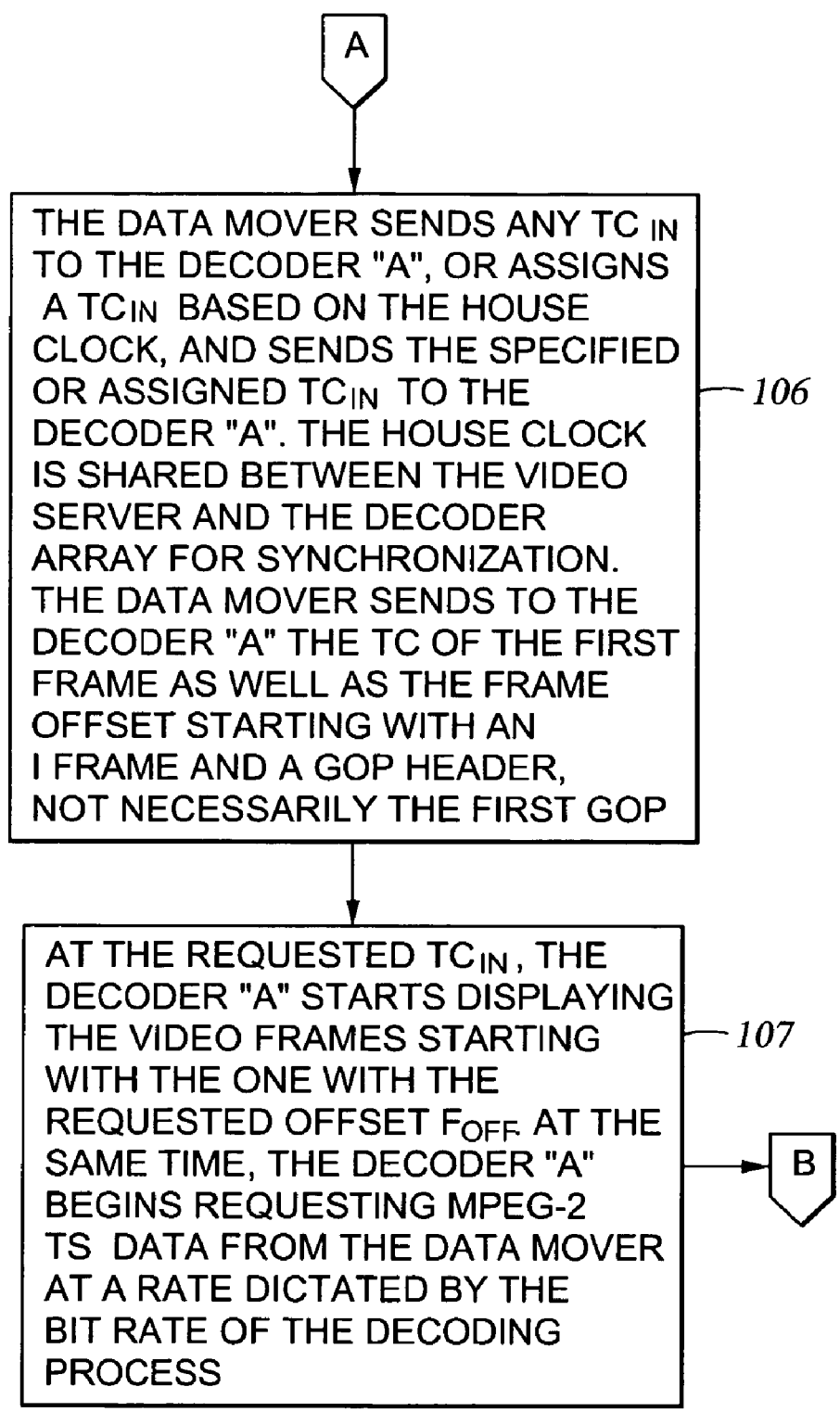
FIG. 10 is a second sheet of the flow chart begun in FIG. 9.

In step 106 of FIG. 10, the data mover sends any specified $TC_{IN}$ to the decoder "A", or assigns a $TC_{IN}$ based on the house clock, and sends the specified or assigned $TC_{IN}$ to the decoder "A". The house clock is shared between the video server and the decoder array for synchronization. The data mover sends to the decoder "A" the TC of the first frame as well as the frame offset starting with an I frame and a GOP header, not necessarily the first GOP. In step 107, at the requested $TC_{IN}$ (i.e., when the value of the house clock TC becomes equal to the value of the requested $TC_{IN}$) the decoder "A" starts displaying the video frames starting with the one with the requested offset $F_{OFF}$. At the same time, the decoder "A" begins requesting MPEG-2 TS data from the data mover at a rate dictated by the bit rate of the decoding process. Execution continues from step 107 to step 108 in FIG. 11.

Figure 11:
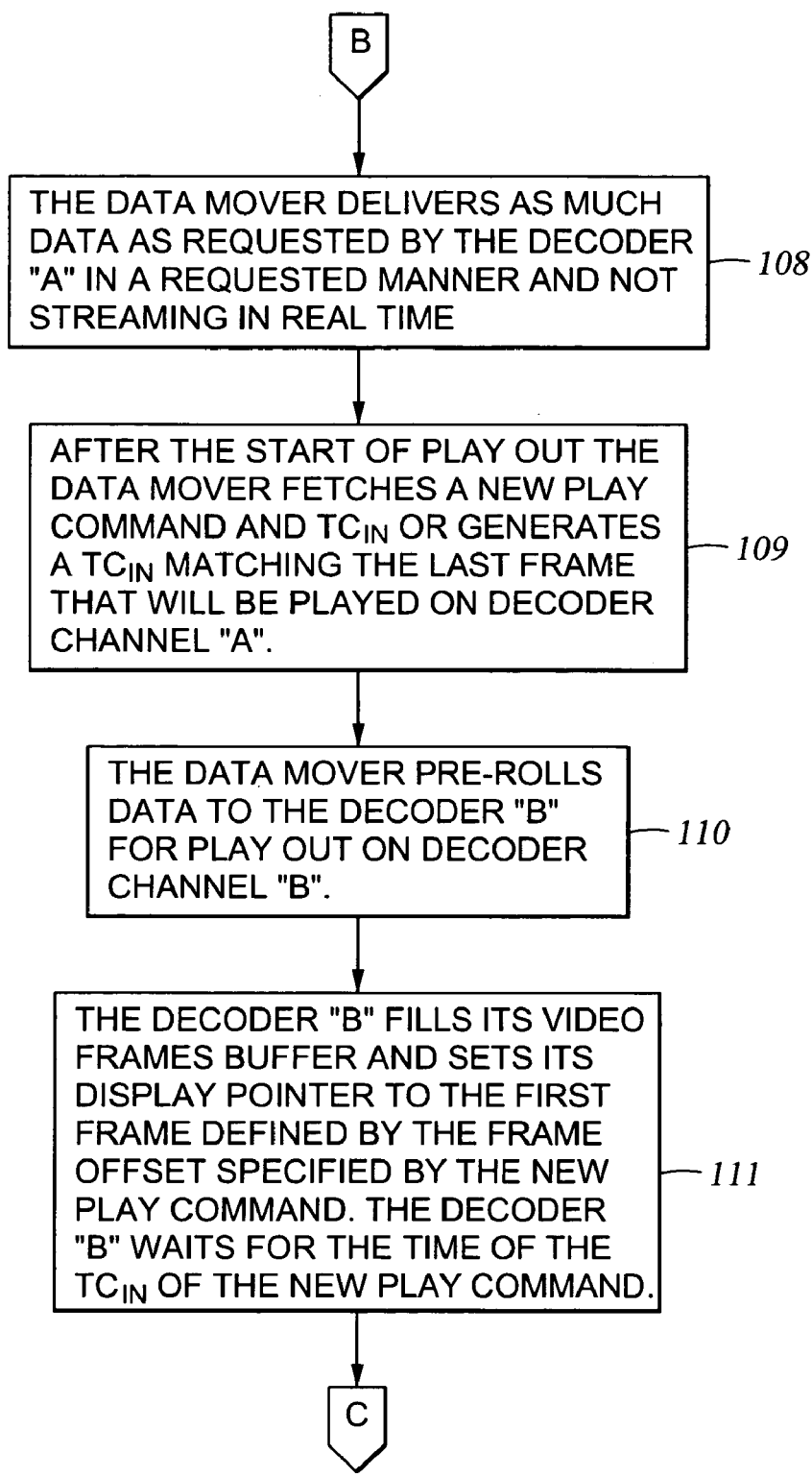
FIG. 11 is a third sheet of the flow chart begun in FIG. 9.

In step 108 in FIG. 11, the data mover delivers as much data as requested by the decoder "A" in a requested manner and not streaming in real time. In step 109, after the start of the play-out the data mover fetches a new play command and $TC_{IN}$ or generates a $TC_{IN}$ matching the last frame that will be played on the decoder channel "A". In step 110, the data mover pre-rolls data to the decoder "B" for play-out on the decoder channel "B". In step 111, the decoder "B" fills its video frames buffer and sets its display pointer to the first frame defined by the frame offset specified by the new play command. The decoder "B" waits for the time of the $TC_{IN}$ of the new play command. Execution continues from step 111 to step 112 in FIG. 12.

Figure 12:
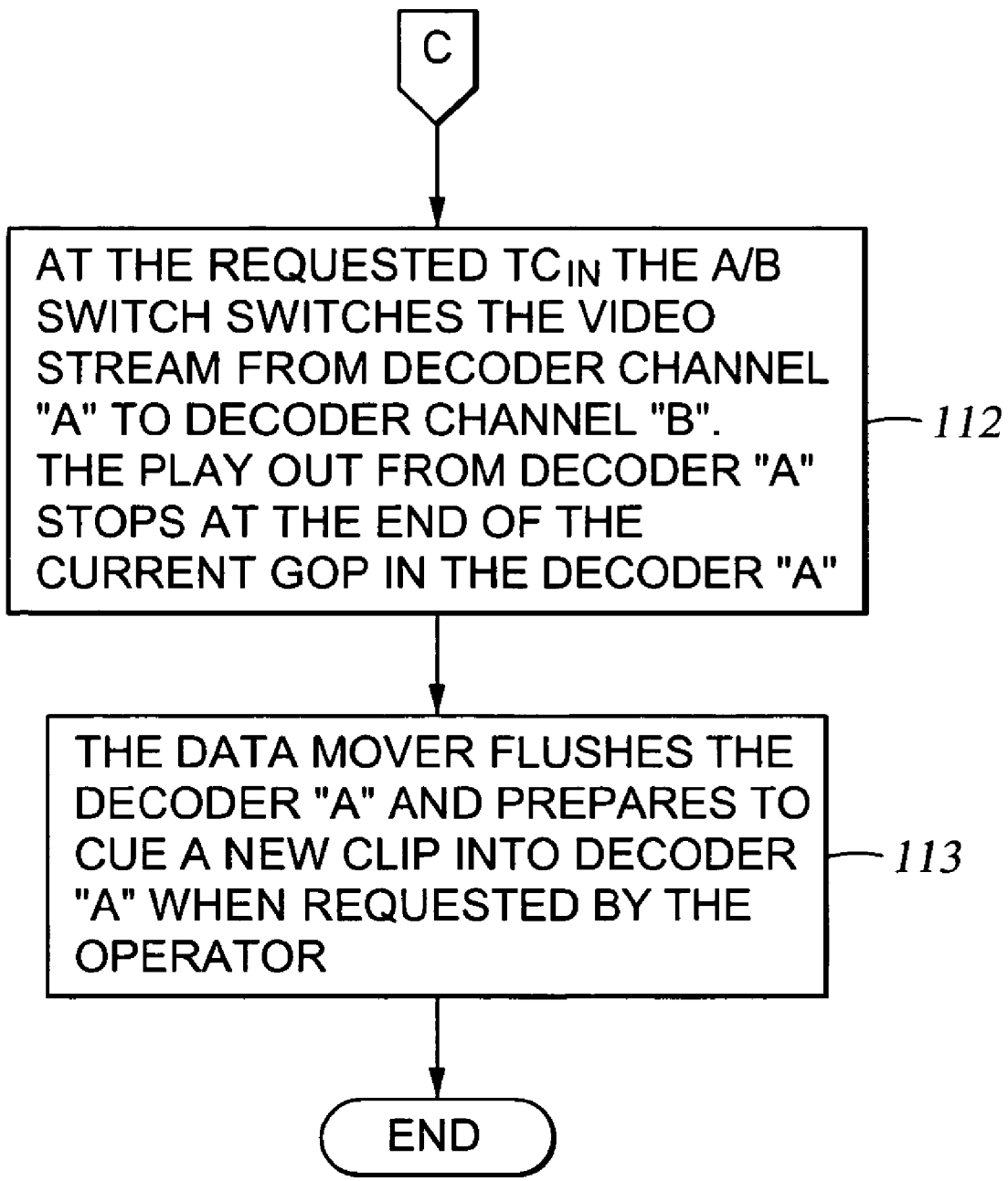
FIG. 12 is a fourth sheet of the flow chart begun in FIG. 9.

In step 112 in FIG. 12, at the requested $TC_{IN}$, the A/B switch switches the video stream from the decoder channel "A" to the decoder channel "B". The play-out from the decoder "A" stops at the end of the current GOP in the decoder "A". In step 113, the data mover flushes the decoder "A" and prepares to cue a new clip into the decoder "A" when requested by the operator. Steps 103 to 113 can be repeated to play additional clips in the play list.

Figure 13:
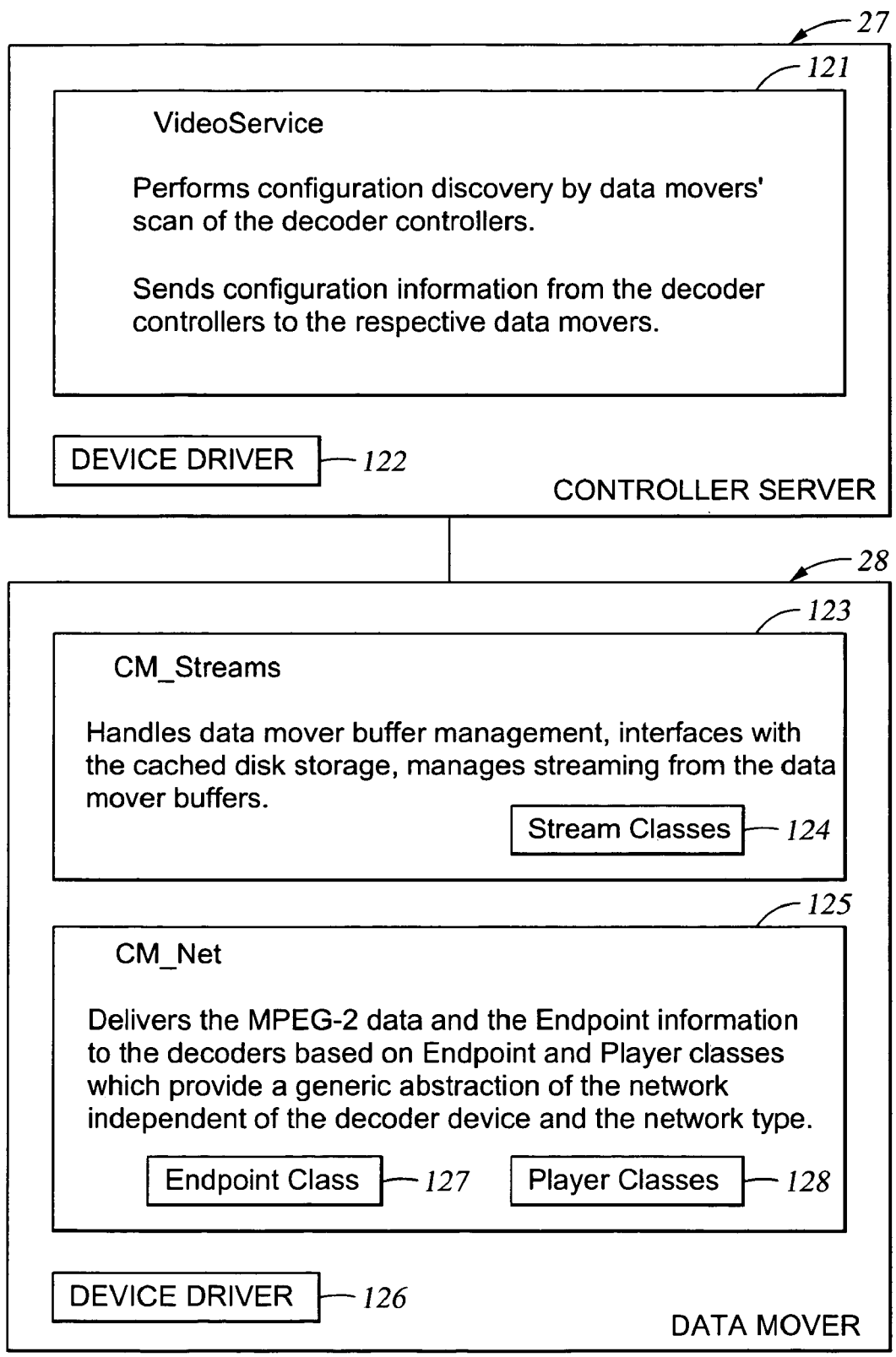
FIG. 13 is a block diagram of the controller server and a data mover in the system of FIG. 1 showing various program functions and data structures programmed in the controller server and the data mover.

As shown in FIG. 13, the controller server 27 and each data mover, such as data mover 28, are programmed with various functions and data structures for sending data and control commands to the decoder array. The controller server 27 is programmed with a VideoService function layered over a device driver, 122, such as a Small Computer System Interface (SCSI) driver, for example. The VideoService function performs configuration discovery by a scan of the data movers connected to a decoder array controller. In other words, the decoder controller is automatically configurable as an external connected device. When VideoService recognizes the unique inquiry string from the decoder array, it sends an appropriate configuration command to each data mover connected to one or more decoder arrays.

The data mover 28 is programmed with a CM_Streams function which handles data mover buffer management, interfaces with the cached disk storage, and manage streaming from the data mover buffers. There is no need to do any "at time" processing nor any splicing in the data mover. The CM_Streams function accesses various stream classes described further below with reference to FIG. 14.

The data mover 28 is also programmed with a network layer CM_Net function tasked with delivering the data to the decoders of the respective decoder pair interfaced to the data mover. The CM_Streams function is layered over the CM_Net function, and the CM_Net function is in turn layered over a device driver 126 for the data links from the data mover to the decoders of the respective decoder pair interfaced to the data mover. The CM_Net function accesses an Endpoint class 127 and Player classes 128, which provide a generic abstraction of the network seen by the data mover regardless of the device or network type. The Endpoint class 127 provides a transparent naming mechanism, while the Player classes 128 abstract the actual output channel.

When the Endpoint class 127 is opened, a data mover thread is instantiated for the endpoint. The thread provides support for those times when the stream or device has gone idle. The thread services both of the ports for the two decoders in a decoder pair when the decoder pair is acting in the dual decoder mode. The player or device driver can query the stream to determine whether the play-out will use the dual-decoder model or will be streaming via a single decoder. If the stream is a VRP type stream, then the player code sends all of the data through the "A" decoder and no attempt is made to switch over to the "B" decoder. Likewise, the same approach can be taken to support a "raw" data format.

Figure 14:
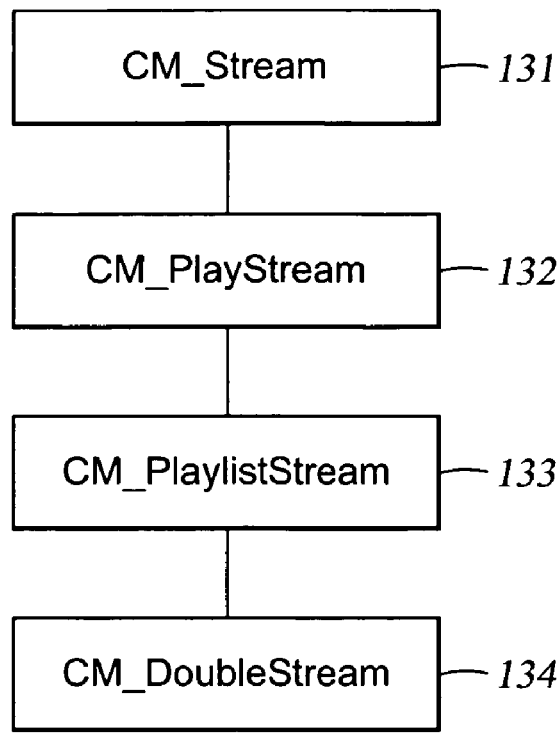
FIG. 14 is a hierarchy of stream classes.

FIG. 14 shows a hierarchy of stream classes. A CM_Stream class 131 is a base class for streams that deliver data to either one or a pair of decoders. The CM_Stream class does not itself directly support "at time" operations, although it supports some minimal MPEG processing such as positioning by frame and PID re-mapping, but not splicing, padding, or "at time" scheduling. The CM_Stream class makes available a number of interfaces to the CM_Net function, including:

```
CM_IOBuffer*  takeBuffer1st();
CM_IOBuffer*  takeBuffer2nd();
void          clipStart();
void          clipDone();
void          decoderError();
```

The stream class CM_PlayStream 132 is invoked for playing a stream, and the class CMPlayListStream 133 is invoked for playing a next stream from the play list. The class CM_DoubleStream 134 is invoked for playing a stream from the next "A" or "B" channel of a decoder pair, by pre-rolling to the idle decoder and then switching channels.

Figure 15:
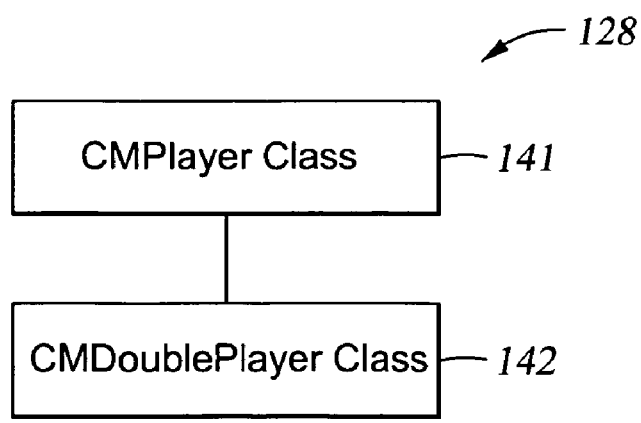
FIG. 15 is a hierarchy of player classes.

FIG. 15 shows a hierarchy of the player classes 128. Player instances of output channels for the streams all derive from a CMPlayer base class 141. A number of player interfaces are provided to pass the "at time" information to the player classes. The player is also provided with the bit rate of each clip (this information is used to smooth and adjust data delivery rates). Finally, the player is informed of certain stream state changes, such as canceling a clip that has already been cued.

Support is also provided for the specific decoder models. Appropriate sub classes are derived for each of the decoder types. The CMDoublePlayer class 142, derived from the CMPlayer class 141, serves as the base class for any dual decoder type device. It provides the methods required to support delivering data in either the single decoder mode (for VRP and "raw" data streams) and the dual decoder mode for "any frame at any time" support for MPEG streams.

The following member functions are accessed by stream:
boolean_t isDual(void);
This member function returns a flag indicating whether the player type is a dual decoder type. This function overrides the function in the CMPlayer class and always returns TRUE.

void clearSingle(void);
This member function is the default operation for dual decoder player types. The default operation is to operate as a single decoder device. This is to make them backward compatible with existing stream types. New stream types that are dual decoder aware (such as CM_DoubleStream) can call clearSingle( ) to put the Player in dual decoder mode.

The following member functions are accessed by driver:
BufferSource::Status takeBufferDescriptorList(DescriptorList*&);

This member function is used to get the next buffer descriptor that points at the data to be played. This function is only valid when the player is in the single decoder mode.
BufferSource::Status takeBufferDescriptorListA(DescriptorList*&);
BufferSource::Status takeBufferDescriptorListB(DescriptorList*&);

These two member functions are used to get the next data descriptor for either the A or the B channel respectively. These functions are only valid in the dual decoder mode.
boolean_t isSingle(void);
This member function is used by the derived player instance to determine what mode the play-out is in.

The following virtual member functions are implemented in derived class:
boolean_t startClip(cHandle_t id, ulong_t frames, int offset, timecode_t* tc);
This function is called when a clip is first introduced to the player. The function is called with identifier, id, which is unique for the stream. Also, the total number of frames in the clip, frames; the number of frames to skip at the beginning of play, offset; and the time when the play is to start is provided.

boolean_t abortClip(cHandle_t id);
This function is called to stop the play or pre-roll of a clip. The player or driver takes action to stop the current play if the clip is already playing or cancels the pre-roll if the clip has not already started. Clips which have been previously identified to the player is via a startClip( ) are aborted. If the clip is not known to the player then the function returns TRUE.

boolean_t modifyClip(cHandle_t id, ulong_t frames, int offset, timecode_t*tc);
The modifClip( ) function is used to change the parameters of a clip after it has been introduced to the player. The number of frames, the starting frame offset, and the time code to start can all be changed. The function returns TRUE if the clip is known and the change can be made; otherwise it returns FALSE.

FIG. 16 is a table showing various commands in the control protocol used by a data mover of the video server for communicating with a decoder controller for controlling the decoder array. The control protocol is divided into four groups of messages, including a configuration group, a streaming group, asynchronous status report group, and an edit group. The first three of these groups are based on the RPC protocol. The Edit group is based on SMPTE protocols.

The configuration group allows a data mover to determine the configuration of the decoder array and set up any configuration parameters. Commands in this group include QueryStatus and Configure.

The streaming group controls delivery of streams (i.e., timing, clips, transition type). Commands in this group include PrerollClip, ModifyDisplayTime, CancelClipPreroll, PauseClip, ResumeClip, and ModifyClip.

The asynchronous status report messages provide asynchronous reports of significant events from a decoder array to a data mover directly connected to the decoder array. Commands in this group include ClipHasStarted, ClipHasEnded, ClipIsEnding, TrapMessage, and EditSummary.

The edit messages allow all decoders in the decoder array to be controlled by an edit control station. Commands in this group include Jog forward/backward, Shuttle forward/backward, Stop, Goto a specific timecode, and normal Play.

Each decoder is referenced by an index in the range 0 to 5 and only the even-odd pairs are included in the respective decoder pairs. For example, indices 0 and 1 reference the two decoders (32 and 33) in the a first decoder pair, indices 2 and 3 reference the two decoders (34 and 35) in a second decoder pair, and indices 4 and 5 reference the two decoders (36 and 37) in a third decoder pair.

The control protocol also references the following set of common data types:

Following is a description of specific commands recognized in the control protocol.

The Configure command allows a data mover to configure a decoder array that is directly connected to the data mover. Configure( ) allows the data mover to set up the UDP port to be used for asynchronous status reports and Edit messages, and the operational mode of individual decoders.

```
/* Frame number within a GOP in display order */
    typedef unsigned long FrameNumber_t;
/* Count of frames transmitted */
    typedef unsigned long FrameCount_t;
/* State of a decoder */
    enum decoderState_t {DS_STOPPED, DS_STREAMING, DS_PREROLLING};
/* Clip identifier */
struct ClipID_t {
    unsigned long   id
    unsigned long   seq;
};
/* Type of time code */
    enum DisplayTimeType_t { DTT_UNKNOWN, DTT_HOUSECLOCK,
    DTT_NOW };
/* Time code */
struct DisplayTime_t {
    DisplayTimeType_t type;
    unsigned char hour;
    unsigned char minute;
    unsigned char second;
    unsigned char frame;
    };
For DisplayTimeType_t set to DTT_UNKNOWN or DTT_NOW, hour, minute,
second, and frame shall be set to '0'.
/* Type of transition between clips */
enum TransitionType_t { TT_NULL, TT_CUT, TT_FADE, TT_FADE_CUT,
TT_CUT_FADE, TT_DISSOLVE };
/* Transition descriptor */
struct Transition_t {
    TransitionType_t type;
    int frames_to_transition;
    unsigned int alpha;
"alpha" is defined as the weighting factor assigned to the output of the on-air decoder
that is transitioning to off-air. "1 minus alpha" is the weighting factor assigned
to the output of the off-air decoder transitioning to on-air.
};
```

```
/* Mode of an individual decoder */
enum decoderMode_t { DM_UNCONFIGURED, DM_AB_GANGED, DM_
SINGLE };
/* Video Standard /*
enum VideoStandard_t {STD_NTSC, STD_PAL};
/* Type of LTC signal being received */
enum LTCtype_t { LTC_TYPE25, LTC_TYPE29, LTC_TYPE30 };
/* Audio Embedding */
enum decoderAudioEmbed_t {AE_ENABLED, AE_DISABLED};
/* Error Concealment Mode */
enum ErrorConcealment_t {EC_FREEZE_FRAME, EC_BLACK_FRAME };
/* Configuration of an Individual decoder */
struct decoderSetup_t {
    int                    decoder;
    unsigned short         flow_control_port;
    decoderMode_t          mode;
    ErrorConcealment_t     error_concealment;
    decoderAudioEmbed_t    audio_embed;
    int audio_delay_ms;    unsigned int request_interval_ms; };
/* Configuration of the decoder array */
struct DecoderArrayConfiguration_t {
    struct in_addr         eth100_IP;
    unsigned short         async_port;
    VideoStandard_t        video_standard;
```

-continued

```
        LTCtype_t           ltc_type;
        decoderSetup_t      decoders<>;
};
DecoderArrayRequestStatus_t Configure(DecoderArrayConfiguration_t);
```
The QueryStatus command may be sent to the decoder array at any time but is primarily designed for use during startup for autoconfiguration. QueryStatus() returns the current status of the entire decoder array and allows the data mover to discover the configuration of the decoder array and, potentially, resume operation if the data mover crashes.
```
/* Return status for control requests */
enum DecoderArrayRequestStatus_t { RS_SUCCESS, RS_FAILURE, RS_
TOOLATE };
/* Overall status of the decoder array (self test) */
enum DecoderArrayTestStatus_t { ND_OK, ND_FAILED, ND_BUSY };
/* Hardware version */
struct HWversion_t {
        unsigned int        release;
};
```

A software version has three components to its name. The three components are separated by periods. For example, a software release name has the syntax major.minor.point, where each component is a member of the SWversion_t struct.

```
/* Software version */
struct SWversion_t
        unsigned int        major;
        unsigned int        minor;
        unsigned int        point; };
/* Status of the LTC signal */
enum LTCstatus_t { LTC_NEVER_SEEN, LTC_ACQUIRED, LTC_
LOST };
/* Genlock Status */
enum Genlock_t {GEN_LOCKED, GEN_NOTLOCKED};
/* Link Status */
enum LinkStatus_t { LS_OK, LS_ERRORED, LS_LOST };
/* Current information for a single decoder */
struct DecoderInfo_t {
        DecoderMode_t       mode;
        DecoderState_t      state;
        unsigned int        buffer_size_bytes;
        ClipID_t            clip;
        DisplayTime_t       when;
        /* set to 0,0 when there is no previous clip */
        ClipID_t            previous;
        DisplayTime_t       last_switch_time;
        FrameCount_t        frame_count; };
/* Current status of the decoder array */
struct DecoderArrayStatus_t {
/* decoder array Static Status Parameters */
        HWversion_t         hw_version;
        SWversion_t         sw_version;
        DecoderArrayTestStatus_t  status;
/* decoder array Dynamic Status Parameters */
        LTCstatus_t         ltc_status;
        Genlock_t           genlock_status;
        LinkStatus_t        eth100_link_status;
        LinkStatus_t        gbe_link_status;
        LinkStatus_t        rs422_1_status;
        LinkStatus_t        rs422_2_status;
        struct in_addr      eth100_ip;
        struct in_addr      gbe_ip;
/* DecoderArray Configurable Status Parameters */
        unsigned short      async_port;
        VideoStandard_t     video_standard;
        LTCtype_t           ltc_type;
        decoderSetup_t      decoder_setup<>;
/* Individual decoder Information */
        DecoderInfo_        t decoders<>; };
DecoderArrayStatus_t QueryStatus(void);
```

The PrerollClip command is used to inform a decoder that a new clip is being loaded and should be loaded into its buffers ready for play-out.

```
/* Decoder Preroll Mode */
enum PrerollMode_t {PM_STREAM, PM_EDIT};
struct PrerollData_t {
        int                 decoder;
        ClipID_t            clip;
        FrameNumber_t       frame_offset;
        DisplayTime_t       display_time;
        Transition_t        transition;
        PrerollMode_t       mode;
        int                 aver_i_spacing;
        DisplayTime_t       mark_in;
        DisplayTime_t       mark_out
};
```

For an open GOP (i.e., a GOP with the first frame referring to a frame in a previous GOP), frame_offset may describe a frame in the following GOP.

PrerollMode_t indicates whether the decoder is in Edit mode or Stream mode when pre-rolling. When a decoder is pre-rolling in Edit mode, the DisplayTime_t must be set to "DTT_NOW."

The average I-frame spacing is used by a decoder in Edit mode to calculate which I-frames must be displayed and when, in order to play out the clip at the required speed. DecoderrarayRequestStatus_t PrerollClip(PrerollData_t);

The ModifyDisplayTime command allows the data mover to modify the display time associated with a clip which is already pre-rolled.

```
struct ModifyData_t {
        int                 decoder;
        ClipID_t            clip;
        DisplayTime_t       display time;
};
DecoderArrayRequestStatus_t ModifyDisplayTime(ModifyData_t);
```
The CancelClipPreroll command is used to cancel streaming of a clip which has been prerolled.
```
struct CancelData_t {
        int                 decoder;
        ClipID_t            clip;
};
DecoderArrayRequestStatus_t CancelClipPreroll(CancelData_t);
```
The PauseClip command is used to pause the streaming or pre-rolling of a clip.

-continued

```
struct PauseClip_t {
    int             decoder;
    ClipID_t        clip;
};
DecoderArrayRequestStatus_t PauseClip(PauseClip_t);
    The ResumeClip command is used to resume the streaming or pre-
rolling of a clip.
struct ResumeClip_t {
    int             decoder;
    ClipID_t        clip;
};
ND_RequestStatus_t ResumeClip(ResumeClip_t);
```

The ModifyClip command is sent by a decoder in Edit mode to the data mover that is directly connected to the decoder. The decoder calculates the required I-frame spacing of the clip. This command is sent when the required I-frame spacing of the clip must be modified.

```
enum DecoderStreamMode_t {DSM_FRAMES, DSM_ALL_FRAMES};
struct ModifyClip_t {
    int                     decoder;
    ClipID_t                clip;
    DisplayTime_t           time_code;
    DecoderStreamMode_t     mode;
    int                     i_space;    /* calculated by decoder*/
};
clip is the Clip ID of the last clip that was pre-rolled.
i_space is calculated by the decoder and can be a positive or negative number. A
negative value indicates that the data mover should play an I-frame only clip in reverse.
void ModifyClip(ModifyClip_t);
    These reports are sent by the decoder array to the data mover when some
significant event has occurred.
struct ClipActionInfo_t {
    int             decoder;
    ClipID_t        clip;
    DisplayTime_t   action_time;
    FrameCount_t    frame_count;
};
```

The ClipHasStarted report is issued when a decoder A-B switch occurs. The report is sent by the decoder that is switched on-air and it is sent concurrent with the first frame. The decoder array saves this information so that a subsequent QueryStatus command may recover it. The information is overwritten by the next ClipHasStarted report. The following fields are valid in the ClipActionInfo_t structure:

| | |
|---|---|
| decoder d | coder index of decoder brought on-air |
| clip | ID of clip just started to be displayed |
| action_time | House Clock time when clip started |
| frame_count | number of frames decoded for the previous clip; when no previous clip exists, frame_count should be set to '0' |
| void ClipHasStarted(ClipActionInfo_t); | |

The ClipHasEnded report is issued when an clip has terminated because it has reached the end of the data stream. It is sent by the decoder that goes off-air and it is sent concurrent with the last frame. A subsequent clip may be pre-rolled for display sometime in the future or with no specified display time. The following fields are valid in the ClipActionInfo_t structure:

| | |
|---|---|
| decoder | decoder index of decoder going off-air |
| clip | ID of clip just ended action_time House Clock time when clip ended |
| frame_count | number of frames decoded for the clip |
| void ClipHasEnded(ClipActionInfo_t); | |

The ClipIsEnding report is issued by the on-air decoder. When the decoder detects the end of data flag in a Data message, it shall send the ClipIsEnding report. It is intended to be used by the data mover to send the on-air decoder a pre-roll command while it is still decoding on-air. By overlapping pre-rolling with streaming, the data mover can play shorter clips. The following fields are valid in the ClipActionInfo_t structure:

| | |
|---|---|
| decoder | decoder index of on-air decoder |
| clip | ID of the clip about to end |
| void ClipIsEnding(ClipActionInfo_t); | |

The control station sends the Mark In (MI) and Mark Out (MO) data to the data mover which sends it in turn to the decoder it is controlling. The EditSummary report is sent by the decoder to the data mover. The data mover will pass the Mark In and Mark Out information to the control station.

```
struct EditSummary_t {
    int             decoder_index;
    ClipID_t        clip;
    DisplayTime_t   mark_in;
    DisplayTime_t   mark_out;
};
void EditSummary(EditSummary_t);
```

The trap message has the following structure:

```
struct TrapMessage_t {
        int                     decoder_index;
        ClipID_t                clip;
        DisplayTime_t           action_time;
        FrameCount_t            frame_count;
        int                     event_code;
};
``` decoder_index is the decoder index of the decoder initiating the report. A decoder_index value of "−1" shall be used to identify the decoder array as a whole. frame_count is the number of frames decoded from beginning of Clip until action_time. event_code is a unique code that identifies a specified event that crosses a specified threshold. A threshold can be set to "Infinite," i.e., the threshold will never be reached and the event will never be reported. A threshold can be set to "Now," i.e., a single event causes an asynchronous status report. Threshold can be set to any value in between the two extremes.

void TrapMessage(TrapMessage_t);

Editing commands are sent to a single decoder in the decoder array from the control station. The decoder returns the time code to the control station every frame. The physical protocol between the control station and the decoder array, for example, is SMPTE RP 170-1993. A single decoder can be put into the edit mode by receiving a PrerollClip command from the data mover with mode set to "Edit." (All edit commands sent to the decoder before the decoder is put into the Edit state by the PrerollClip command, are ignored by the decoder.) The decoder pre-fills the clip up to the specified frame number and then stops. (The decoder stops by sending request messages to the data mover with state set to "Stopped.") The decoder waits for edit commands from the control station. The edit commands are: Stop, Shuttle, Jog forward/backward, Goto a specific timecode, and Play from a specific timecode. Jog is defined as playing out forward or backward frame by frame. Shuttle forward and backward is defined as playing out at a speed not equal to real time.

While the decoder is in Edit mode and either Jogging forward or Shuttling forward in less than real time, it sends periodic request messages to the data mover (as it does when streaming). The request messages indicate the factor of real time that data is being decoded. The data mover should continue to stream data to the decoder.

When the decoder is in Edit mode and receives a request for backward Jog/Shuttle or Shuttle forward faster than real time, the decoder sends the data mover a ModifyClip command, indicating whether the server should send all frames or I-frames only, and what the I-frame spacing should be. The data mover replies with a PrerollClip command, with the edit flag set and the average I-frame spacing for the clip. The decoder pre-rolls the clip and executes the edit command at the specified frame number and with the specified I-frame spacing.

For backward Jog/Shuttle, the decoder may have to send the data mover a new ModifyClip command with a time code of the frame previous to the current frame. If the decoder can locate the previous time code in its buffer, it may not need to send a ModifyClip command to decode the previous frame. When a decoder receives the "Stop" command from the control station it freezes on the current frame and enters the "stopped" state. When a decoder receives the "Goto" command, it sends the ModifyClip command to the data mover, receives a PrerollClip command from the data mover, displays the specified frame and enters the "stopped" state.

When the decoder sends a ModifyClip command to the data mover with mode set to I-frame only, the decoder tells the data mover to construct a stream with a specific I-frame spacing. The I-frame spacing and the decoder display rate determine the play-out speed of the decoder. The decoder uses the requested shuttle speed to calculate an I-frame spacing and display rate. It compares the new I-frame spacing with the I-frame spacing of the current clip. If the new I-frame spacing is different from the current I-frame spacing, a ModifyClip command is sent to the data mover. enum ND_decoderStreamMode_t (Iframes, AllFrames);

As introduced above, the data movers in the video server of FIG. 1 use a data protocol for streaming continuous media data, such as MPEG-2 encoded TS data, to the decoders in the decoder array. The data protocol provides for full flow-control, uniform data rates, and resilience to loss or delay of flow control messages. The protocol makes use of multiple, concurrent "request" messages that unambiguously specify the total available buffer space (window). The number (or level) of redundant requests is chosen to significantly reduce the possibility of a disruption in flow and to minimize the effect even if such a disruption does occur. The frequency of the "request" messages must be high enough to allow the data mover to stream media without interruption, even with a loss of several messages. For groups of redundant request messages, the data mover receives at least one request message of a group before the data mover fills up the window requested by the previous group of messages, in order to keep the data mover streaming. A request that is actually received by the data mover begins a new redundancy group.

In a steady-state streaming mode, the periodic "request" messages should nominally advertise a constant size window (i.e., regardless of the time base, the amount of data arriving should be equal to the amount of data being consumed). The overall rate of delivery can be adjusted based on long term trend in changes in the window size. The protocol can be used as a simple request-response protocol, without overlapped requests. However, this mode does not provide uniform delivery rates and lost messages can cause significant problems.

A redundancy group can consist of a group of consecutive Request messages or a single Request message. A Request message that starts the data mover to stream data to a decoder is the start of a redundancy group. For a Redundancy Factor of n, up to n−1 consecutive Request messages from a single decoder can be lost, and the data mover will continue to stream data to the decoder. If n consecutive Request messages are lost from a decoder, then the data mover stops streaming data to that decoder and only starts again when it successfully receives a Request message.

Figure 17:
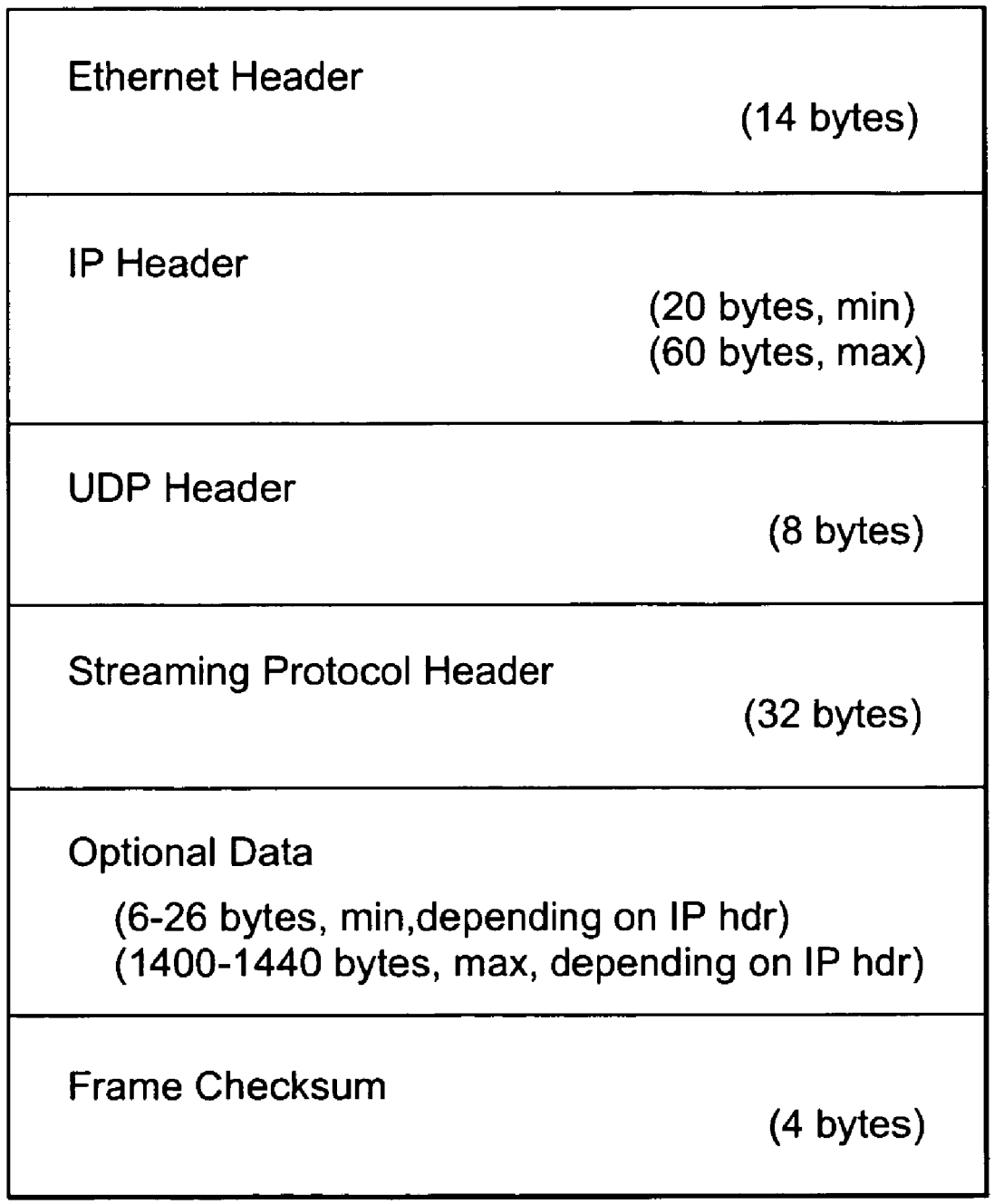
FIG. 17 is a format of a streaming protocol Ethernet packet.

The streaming protocol communication is via UDP in both directions. FIG. 17 shows the format of each message exchanged between the decoder and data mover. All messages are constrained to fit in a single Ethernet packet, in order to eliminate any need for re-assembly.

A Request message is sent from the decoder to the data mover at regular intervals. The message consists of a header only. FIG. 18 shows a preferred format of the Request message header. The Request message number field is a 32-bit unsigned number that is assigned to each Request message by the decoder. The numbers are assigned sequentially. The Clip ID number is a 64-bit unsigned number that consists of two 32-bit fields. The first field is an ID number. The second field is a sequence number. The sequence number indicates the version of a clip with the given ID number. The clip ID is assigned by the video server or data mover and sent to the decoder before the decoder sends out its first Request message. The clip ID identifies the segment of a stored clip that is transmitted by the data mover to the decoder. The clip ID may identify the entire stored clip or a segment of the stored clip.

The offset is a 32-bit unsigned number that counts the number of bytes of the clip that have been received by the decoder. Each time the offset field rolls over to its base address, a new section of the clip is being identified, which is $2^{32}$ bytes offset from the previous base address. The window size is a 32-bit unsigned number. It indicates the number of available bytes in the decoder buffer.

The state field is an 8-bit field with the values shown in the following table:

Definition of "State" Field in Request Message

| Value | Definition |
| --- | --- |
| 0 | Reserved |
| 1 | stopped |
| 2 | cueing |
| 3 | streaming |
| 4 | non-overlapped |
| 5–255 | Reserved |

The state field defines the states of the stream. The non-overlapped state may be used by the data mover for testing. The decoder, however, is not operated in a non-overlapped streaming state.

The speed field is a 16-bit field used to hold an unsigned number. The field indicates to the data mover the speed at which the decoder is consuming data, relative to real time. The speed is normalized to 256. For example, a value of 256 indicates decoding at 1× real time. A value less than 256 indicates a speed less than real time. A value greater than 256 indicates a speed greater than real time.

A Data message is sent from the data mover to the decoder. The message consists of a header followed by optional data bytes. FIG. 19 shows the preferred format of the Data message header. The Data message number field is a 32-bit unsigned number that is assigned to each Data message by the data mover. The numbers are assigned sequentially. The Clip ID number field is defined in the Data message as it is defined in the Request message. The flag field is eight (8) bits and is defined in the following table:

Data Message: "Flag" Field Definition

| Bit Position | Value | Definition |
| --- | --- | --- |
| 0 | 1: Data message indicates the end of the clip<br>0: Data message does not indicate the end of the clip | End of Data Flag |
| 1–7 | Not Defined | Not Defined |

The flag in the Data message is an "end of data" flag. It indicates either that the data in the message is the last of the data (if the length is greater than 0) or that there is no more data if the length equals 0. All protocol header data is represented in network order ("big-endian") format.

The data length field is 16-bit unsigned number and indicates the number of bytes of data included in the Data message. The decoder uses this field to calculate the offset value in the next Request message.

Figure 20:
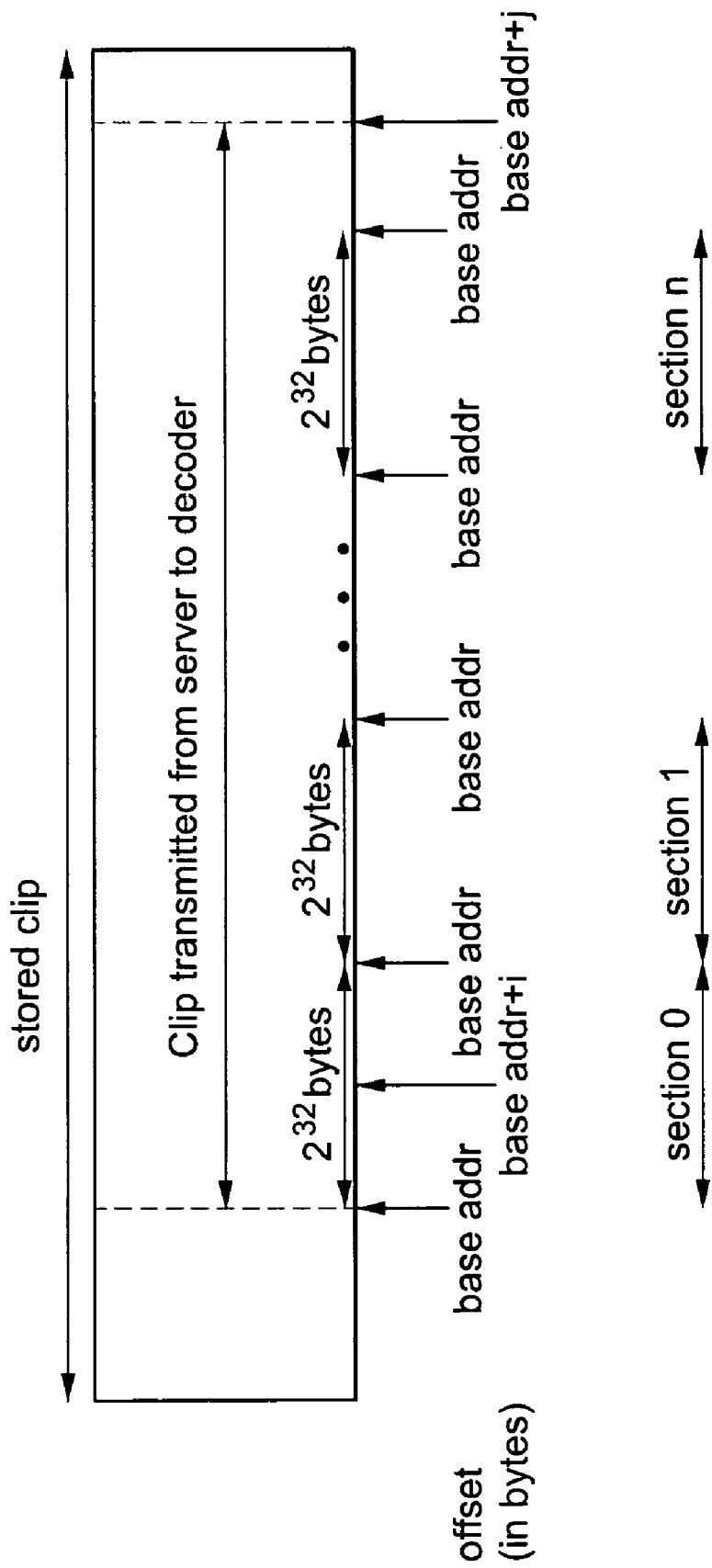
FIG. 20 is a diagram showing a relationship between a stored clip and a segment of the clip as transmitted from a data mover to a decoder.

FIG. 20 shows in further detail the relationship of the offset to sections of a stored clip transmitted from the data mover to the decoder. Each time that the offset field rolls over to its base address, a new section of the clip is being identified, which is $2^{32}$ bytes offset from the previous base address. The offset can be used by the decoder to position data within a buffer (i.e., since data is not retransmitted, holes in the stream can occur).

The offset field is used by the data mover to keep track of any "in flight" data packets when determining the true window size. In the initial Request message, the offset is set by the decoder. The data mover uses the initial offset value in its initial Data message.

Figure 21:
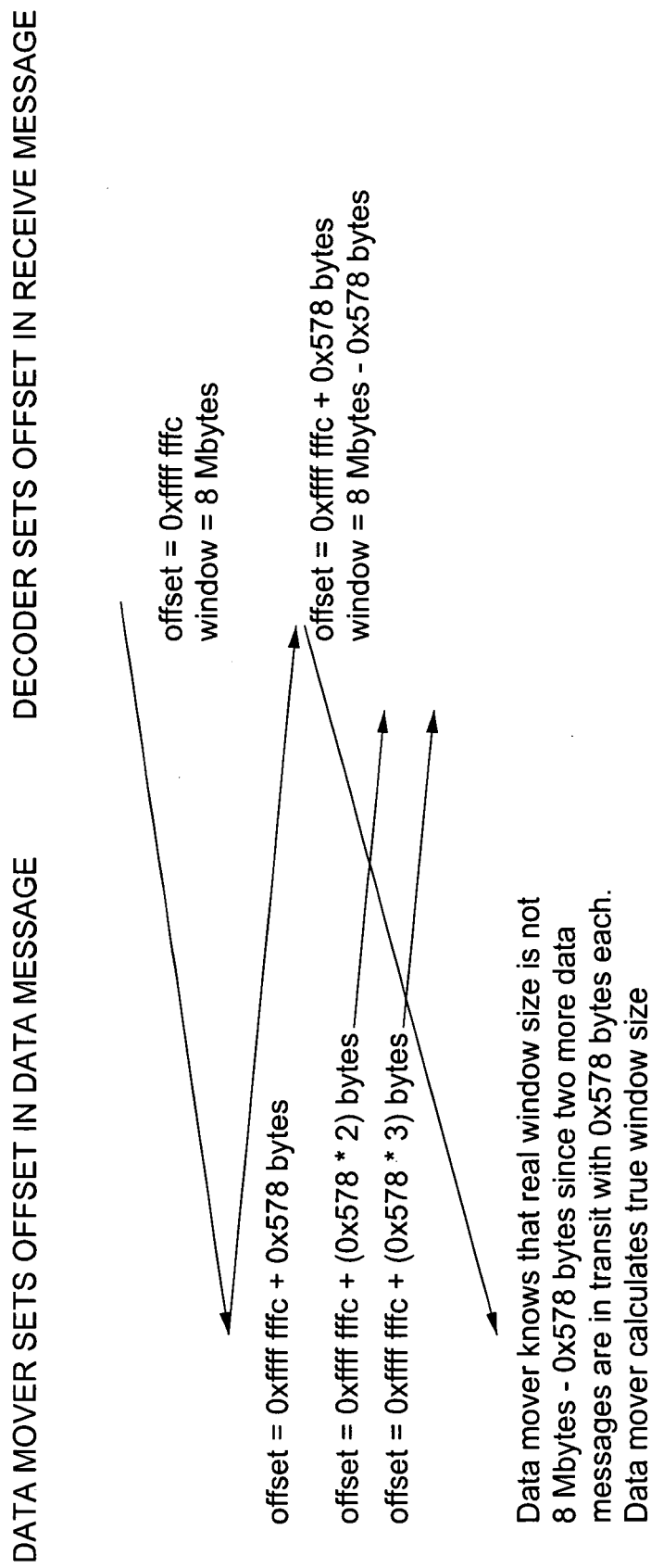
FIG. 21 is a flow diagram showing that the server considers messages in transit to estimate the size of decoder data buffer free space.

FIG. 21 shows an example of the setting of the offset value and the window size. In this example, the data mover keeps track of the amount of data in the decoder data buffer (i.e., the "window size") in order to decide how many data packets to send to keep the decoder data buffer as full as possible without overflow. The data mover computes an estimate of the window size from the last window size reported by the decoder and the amount of data that has been transmitted by the data mover but not yet received by the decoder. Lost data packets could temporarily affect the calculation, but the offset in the next Request message will allow the data mover to correct its calculation, according to the following formula:

The estimate of the window size of the decoder=
(window size)Request message−((offset+data length)Data message−(offset)Request message)

Figure 22:
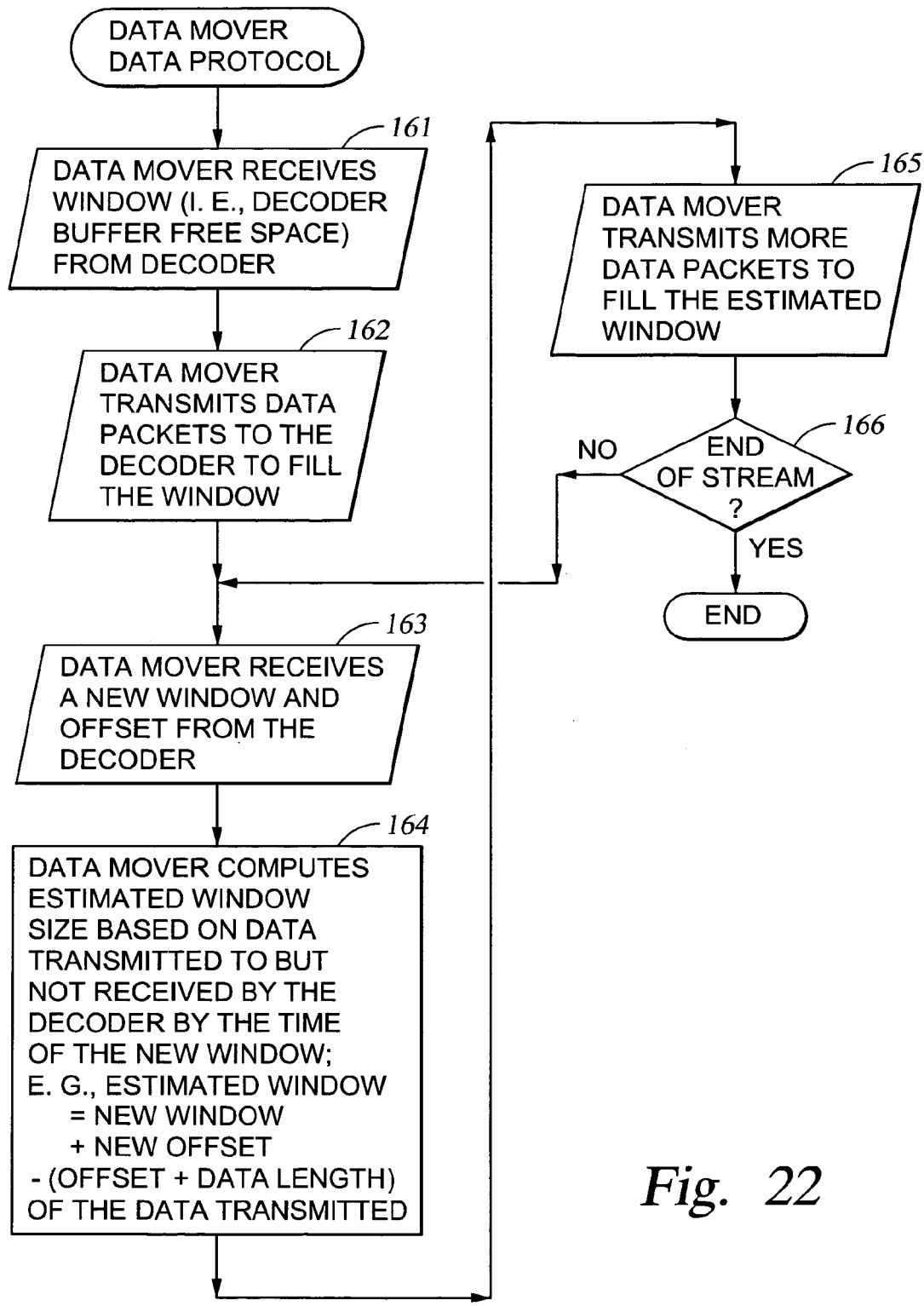
FIG. 22 is a flow chart for programming of the server for the example of FIG. 21.

FIG. 22 shows a flow chart of the program executed by the data mover for the example of FIG. 21. In a first step 161 of FIG. 22, the data mover receives the window (i.e., the decoder data buffer free space) from the decoder. In step 162, the data mover transmits data packets to the decoder to fill the window. In step 163, the data mover receives a new window and offset from the decoder. In step 164, the data mover computes an estimated window size based on the data transmitted to but not received by the decoder by the time of the new window; for example, the estimated window is the sum of the new window and the new offset less the sum of the offset and the data length transmitted since the previous window. In step 165, the data mover transmits more data packets to fill the estimated window. In step 166, execution ends if the end of the video stream for the clip has been reached; otherwise, execution loops back to step 163.

Figure 23:
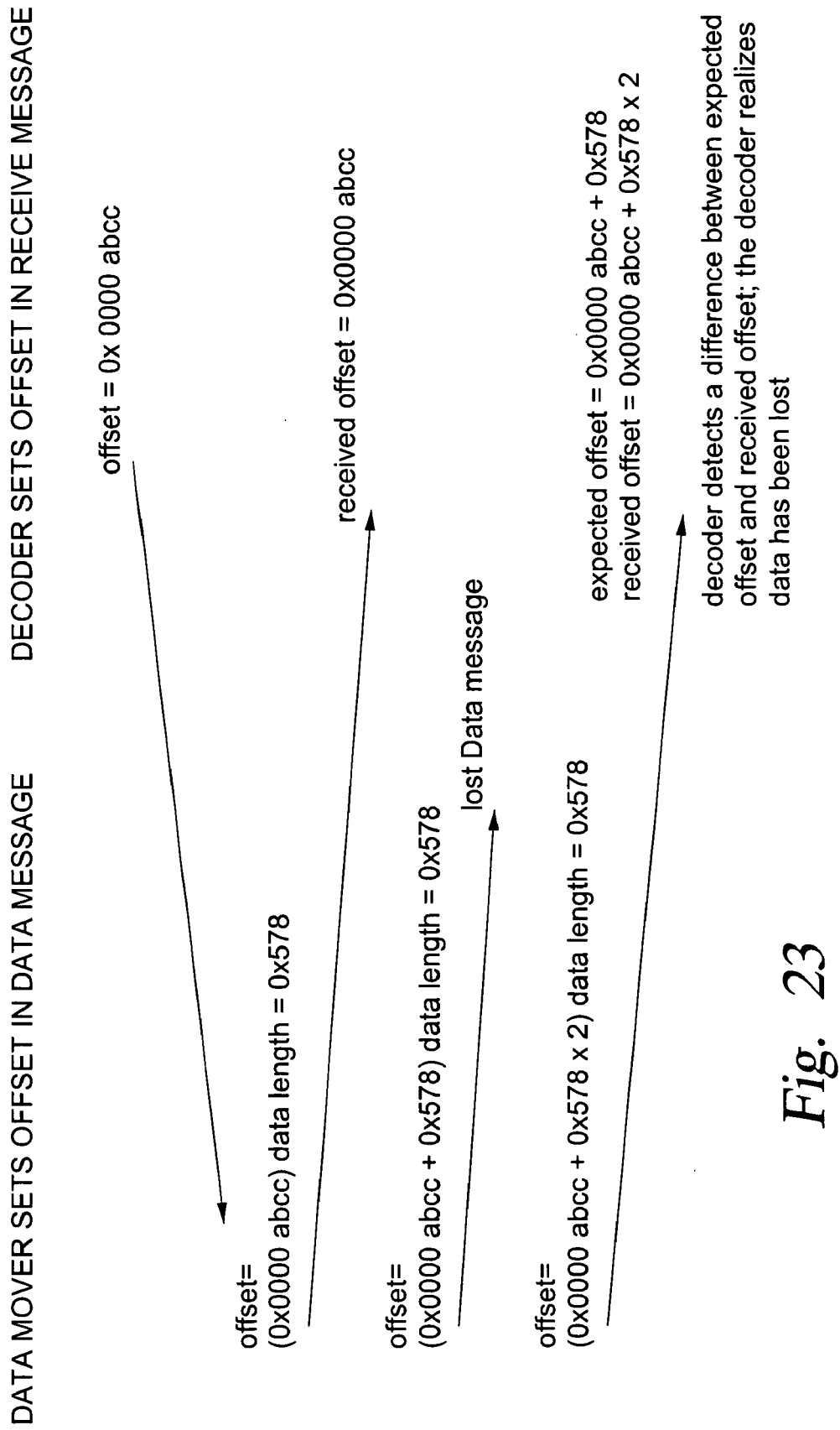
FIG. 23 is a flow diagram showing that a decoder compares an expected data offset to a received data offset to detects loss of a message in transit from the server to the decoder.

FIG. 23 shows an example of the setting of the offset with lost data messages. The decoder computes an estimate of the next offset that should be received from the data mover, and compares it to the offset received from the data mover. When the decoder finds a difference between the expected offset and the received offset, it concludes that data has been lost in transmission from the data mover.

Figure 24:
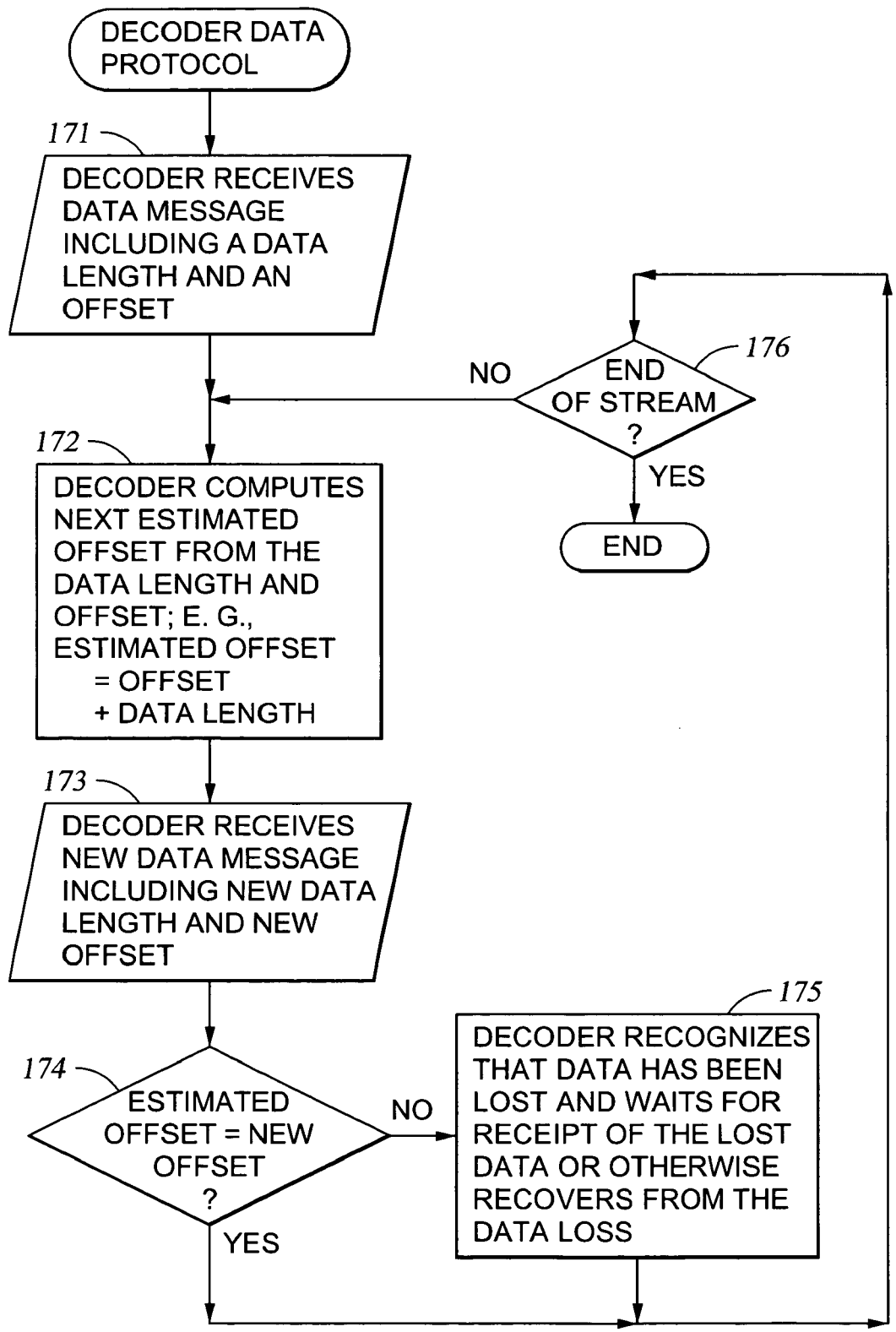
FIG. 24 is a flow chart for programming of the decoder for the example of FIG. 23

FIG. 24 shows a flow chart of a program executed by the data mover in the example of FIG. 23. In a first step 171 of FIG. 24, the decoder receives a data message including a data length and an offset. In step 172, the decoder computes a next estimated offset from the data length and the offset; for example, the next estimated offset is equal to the offset plus the data length from the data message. In step 173, the decoder receives a new data message including a new data length and a new offset. In step 174, the estimated offset is compared to the new offset. If the estimated offset is not equal to the new offset, then execution branches from step 174 to step 175. In step 175, the decoder recognizes that data has been lost and waits for receipt of the lost data before attempting to decode the MPEG-2 TS data of the new data message or otherwise recovers from the data loss, for example, by freezing the last decoded video frame until the end of the clip or until receiving and decoding next I frame in the clip. After step 175, execution continues to step 176. Execution also continues to step 176 from step 174 if the estimated offset is equal to the new offset. In step 176, execution ends if the end of the stream for the clip has been reached. Otherwise, execution loops from step 176 back to step 172.

The stream from the data mover to the decoder can exist in four unique states: "Cueing", "Streaming," "Stopped," or "non-overlapped." FIG. 25 defines the four streaming states.

In the Cueing state, the data mover sends the decoder data, at least up to the time code that must be displayed. The data rate can be at a rate convenient for the data mover. The decoder consumes the data at 1× real time. It is not important if the decoder underflows, since the underflow would be before the display time.

In the Streaming state, the data mover sends the decoder at 1× real time and the decoder consumes the data at 1× real time; the decoder can underflow/overflow and it will affect the picture presented to the viewer.

In the Stopped state, the decoder is not consuming data. During this state, the decoder continues to send Request messages at the configured Request interval.

In the non-overlapped state, the decoder sends a new Request message only after receiving a response from the previous Request message. The data mover may use this mode for testing.

Ideally, the data mover would deliver data at a uniform rate. This simplifies management and loading of the storage, the data mover, memory, busses, and the network. If Request messages arrive before the transmission of all the data to fulfill the previous Request message, then data flow can be maintained. Increasing the frequency of transmission of Request messages (i.e., reducing the time between Request messages) allows uniform data flow even if some Request messages are delayed or completely lost. After the decoder receives a pre-roll command, it begins sending Request messages at the configured Request message interval, with the state field set to "Cueing." After the decoder is pre-filled, the streaming state changes from "Cueing" to "Stopped". (The state is in the Request message is set to "Stopped.") At the display time, the stream enters the "Streaming" state and the decoder starts to display its program. (The state in the Request message is set to "Streaming.") While the decoder is decoding, it continues to send Request messages at the request interval, indicating the decode frame rate in the "speed" field. Based on the window size and the speed at which the data is consumed, the data mover computes when to start sending the decoder data and the rate at which to send the data. The data mover maintains the optimal buffer fullness in the decoder by adjusting the streaming rate.

Figure 26:
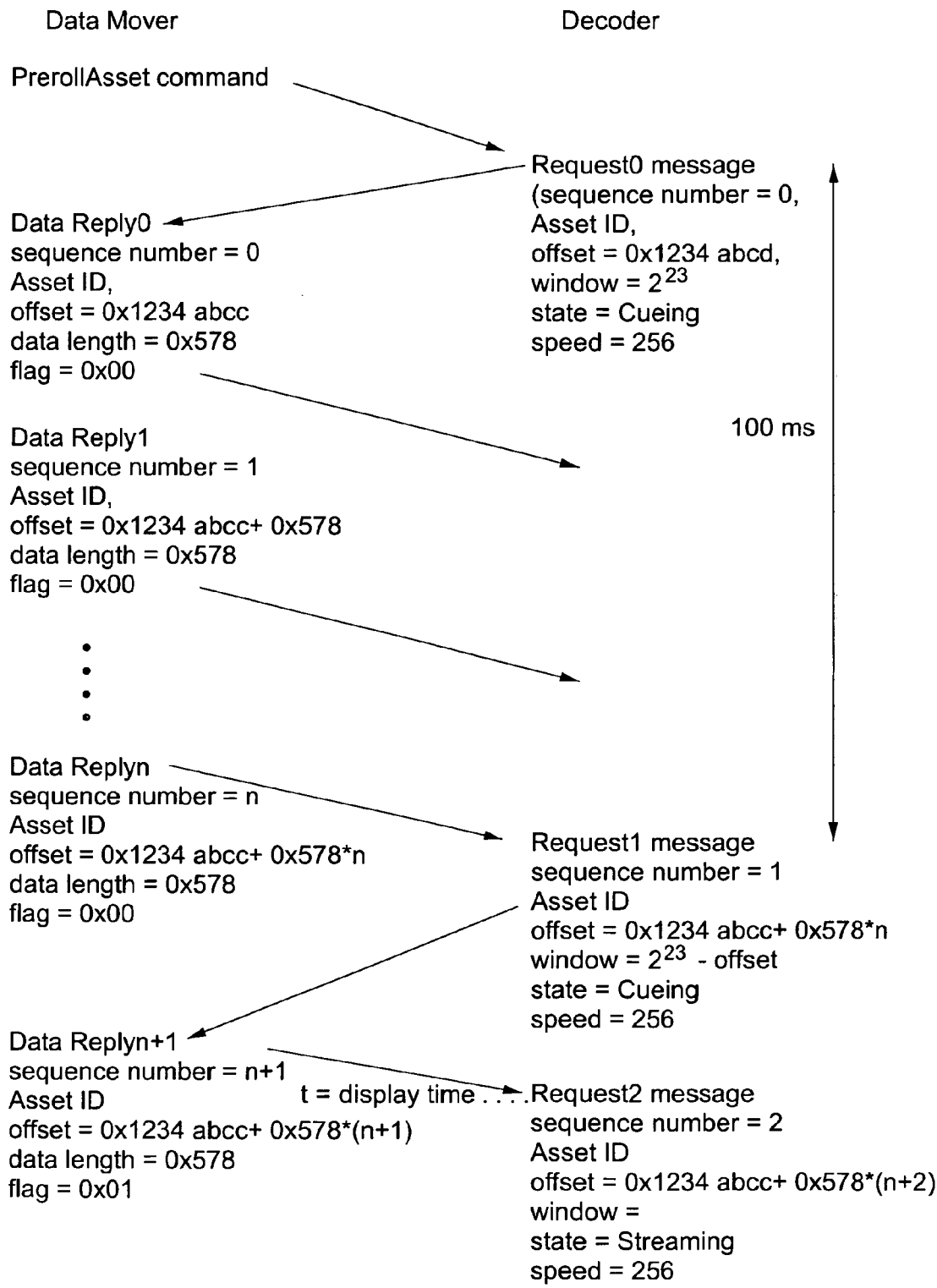
FIG. 26 is a flow diagram showing request and data messages transmitted between a data mover and a decoder.

FIG. 26 shows an example of how the data mover and a decoder transition between various streaming states. Assume that the decoder sends Request messages, at the configured request interval, to the data mover with the state set to "Cueing." (The request rate is computed for a specific clip on a given decoder. It depends on a selected redundancy factor, available buffer space when data mover starts streaming data, and bit rate of clip.) The data mover pre-fills the decoder buffer. If the decoder were pre-filled, it would send a Request message with the state set to "Stopped." (There is no requirement that a stream actually go into the "Stopped" state; however, this would be a typical behavior.) At the display time (TC=$TC_{IN}$), the decoder sets the state to "Streaming" and begins to display the clip.

At some point later, the data mover would begin to stream data to the decoder, to keep the decoder data buffer full. In particular, the data mover is given a redundancy factor and a request rate parameter, which is configurable for each decoder. The Redundancy Factor is defined as:

Redundancy Factor=nominal available buffer space (secs)× request rate (#requests/sec) Therefore, the data mover calculates the nominal available buffer space by dividing the Redundancy Factor by the request rate. As the encoder plays out a clip, the data mover tries to maintain the buffer level around the nominal level. For a redundancy factor of four and a request rate of 100 ms, the data mover begins to stream data to the decoder when the decoder has an available buffer of 0.40 seconds of space.

The data mover would begin streaming data when it receives a Request Rn after the display time. In the example of FIG. 24, this Request Rn is Request2. The data mover would then stream the data at the bit rate of the stream. One hundred milliseconds later, the decoder would send Request Rn+1. If Rn+1 is lost or delayed, the data mover will continue to stream. One hundred milliseconds later, the decoder will send Request Rn+2, and 100 ms after that, it will send Rn+3. If up to three consecutive Request messages are lost, the data mover will still be able to stream data without stopping.

Only if all Request messages in a redundancy group are lost will the data mover stop streaming, but the delay will only be 100 ms (since the data mover will start streaming again when it receives the first Request message of the next redundancy group) and the data mover would still be able to catch up.

In view of the above, there has been described a method and system for producing multiple concurrent real-time video streams from stored MPEG encoded video clips. The system includes a video server and an MPEG decoder array. The decoder array has multiple decoder pairs, each pair having a video switch for switching from the video output of one decoder in the pair to the other at the occurrence of a specified time code. The switching may occur from a specified Out-point frame to a specified In-point frame, and Out-point and In-point frames can be any frame type at any location in the group of pictures (GOP) structure. In a preferred construction, the video server is linked to multiple decoder arrays. The video server has a controller server linked to a number of data mover computers. Each decoder array is directly linked to a respective one of the data mover computers. Each data mover computer use a control protocol to control the decoder array or decoder arrays to which is directly linked by sending control requests to the decoder controller in each decoder array. Each decoder uses a data protocol to request data from the respective data mover computer to which the decoder is directly linked. The control commands include configuration commands to allow the data mover to determine a configuration of the decoder array and to set up configuration parameters, streaming commands to control the In-points and Out-points of the MPEG clips included in each of the multiple concurrent video streams, asynchronous status reports of significant events from the decoder array; and edit commands to allow the decoders in the decoder array to be controlled for editing content of the multiple concurrent video streams. The data protocol permits the data movers to maintain the decoder data buffers in a substantially full condition, and permits the decoders to detect loss of data during transmission from the data mover to the decoder array.

It should be apparent that the preferred embodiment shown in the drawings can be modified in various ways without departing from the invention as defined by the appended claims. For example, in the system of FIG. 1, each data mover is directly linked to a respective one of the decoder arrays. However, it should be understood that each data mover could be directly linked to more than one decoder array. For example, if the data movers were upgraded to double the processor speed and buffer memory of each data mover, then each data mover could be directly linked to a respective group of two decoder arrays. On the other hand, if the data movers were upgraded to double the processor speed and buffer memory of each data mover, then the decoder array could also be upgraded to double the processing speed of the decoder controller and to double the number of decoder pairs in each decoder, and in this case each upgraded data mover would control a respective one of the upgraded decoder arrays.

What is claimed is:

1. A method of producing a real-time video stream from stored MPEG encoded video clips, the MPEG encoded video clips being contained in data storage of a video server, the method comprising:

reading segments of the MPEG encoded video clips from the data storage, the segments of the MPEG encoded video clips being decoded by respective first and second decoders in a decoder pair, the first decoder decoding at least a portion of a first MPEG encoded video clip and the second decoder decoding at least a portion of a second MPEG encoded video clip, the real-time video stream being obtained by operating a video switch to switch between a video output of the first decoder and a video output of the second decoder to select a specified In-point frame in the second MPEG encoded video clip that is selectable as any MPEG frame type at any location in an MPEG group of pictures GOP structure;

which includes operating the decoders and the video switch in response to control commands from the video server, which further includes transmitting asynchronous status reports of decoding events from the decoders to the video server when the decoding events occur, and which includes the decoders transmitting asynchronous status reports when decoding of a first clip has started and when decoding of a second clip has ended.

2. A method of producing a real-time video stream from stored MPEG-2 encoded video clips, the MPEG-2 encoded video clips being contained in data storage of a video server, the method comprising:

reading segments of the MPEG-2 encoded video clips from the data storage, the segments of the MPEG-2 encoded video clips being decoding by respective first and second decoders in a decoder pair, the first decoder decoding at least a portion of a first MPEG-2 encoded video clip and the second decoder decoding at least a portion of a second MPEG-2 encoded video clip, the real-time video stream being obtained by operating a video switch to switch between a video output of the first decoder and a video output of the second decoder at an occurrence of a specified time code to select a specified In-point frame in the second MPEG-2 encoded video clip that is selectable as any MPEG-2 frame type at any location in an MPEG-2 group of pictures (GOP) structure, which includes operating the decoders and the video switch in response to control commands from the video server, the control commands include streaming commands used to control the In-point of the second MPEG-2 encoded video clip included in the real-time video stream, which includes the decoders requesting and obtaining MPEG-2 encoded data from the video server, which includes each decoder obtaining MPEG-2 encoded data from the video server by sending a request for data including a decoder data buffer free space value and an offset value indicating MPEG-2 encoded data previously received from the video server, and the video server responds to the request for data by sending MPEG-2 encoded data sufficient to substantially fill the data buffer free space taking into consideration MPEG-2 encoded data previously sent but not yet received by said each decoder when said each decoder sent the request for data, which further includes transmitting asynchronous edit requests between the video server and the decoders, and transmitting asynchronous status reports of decoding events from the decoders to the video server when the decoding events occur, and which includes the decoders transmitting asynchronous status reports when decoding of a first clip has started and when decoding of a second clip has ended.

3. An apparatus for producing a real-time video stream from stored MPEG encoded video clips, said apparatus comprising:

a video server including data storage containing the MPEG encoded video clips: and an MPEG decoder pair having a video switch for switching from a video output of one decoder in said decoder pair to a video output of the other decoder of said decoder pair at an occurrence of a specified time code, the video server and the decoder pair being programmed for switching said video switch for selecting a specified In-point frame that is selectable as any MPEG frame type at any location in an MPEG group of pictures GOP structure, wherein the video server and the decoder pair are programmed for the video server to control the decoder pair by sending control commands from the video server to the decoder pair, and the video server and the decoder pair are programmed for the decoder pair to request and obtain MPEG-encoded data from the video server, wherein each decoder is programmed to obtain MPEG encoded data from the video server by sending a request for data including a decoder data buffer free space value and an offset value indicating any MPEG encoded data previously received from the video server, and the video server is programmed to respond to the request by sending MPEG encoded data sufficient to substantially fill the data buffer free space taking into consideration MPEG encoded data previously sent but not yet received by said each decoder when said each decoder sent the request for data, wherein the video server and the decoder pair are further programmed for the video server to receive asynchronous status reports of significant decoding events from the decoder pair when the significant decoding events occur, and for the video server to send edit commands to the decoder pair for editing content of the real-time video stream, and wherein the video server and the decoder pair are further programmed for the video server to receive asynchronous status reports from the decoder pair when decoding of a first clip has started and when decoding of a second clip has ended.

4. An apparatus for producing a real-time video stream from MPEG encoded video clips, said apparatus comprising:

a video server for storing the MPEG encoded video clips, and an MPEG decoder pair coupled to the video server for producing a real-time video stream from the MPEG encoded video clips stored in the video server;

wherein the video server includes cached disk storage for storing the MPEG encoded video clips, a data mover computer coupled to the cached disk storage for streaming segments of the MPEG encoded video clips from the cached disk storage to the MPEG decoder pair, and a controller server computer coupled to the data mover computer for controlling the data mover computer; and further including a video switch coupled to the decoder pair for selecting a video output from either one of the decoders in the decoder pair for production of said real-time video stream by switching from the video output from one of the decoders in the decoder pair to a specified In-point frame in the video output from the other of the decoders in the decoder pair, wherein the In-point frame is selectable as any frame and any frame type in a group of pictures (GOP) structure of the MPEG encoded video, and the decoders in the decoder pair are coupled to the data mover computer for receiving segments of the MPEG encoded video clips for the production of the real-time video stream;

which further includes a decoder controller coupled to the decoders and to the video switch for controlling the decoders and the video switch, the decoder controller being coupled to data mover computer for receiving control commands for the production of the real-time video stream;

wherein the control commands include configuration commands to allow the video server to configure the decoder pair by the video server obtaining configuration status of the decode pair and by the video server setting operational modes of the decoder pair, streaming commands to control the In-points of the MPEG encoded video clips included in real-time video stream, asynchronous status report commands to enable the video server to receive asynchronous status reports of significant decoding events from the decoder pair when the significant decoding events occur, and edit commands to allow the decoders in the decoder pair to be controlled for editing content of the real-time video stream, and wherein the control commands include asynchronous status report commands to enable the video server to receive asynchronous status reports from the decoder pair when decoding of a first clip by the decoder pair has started and when decoding of a second clip by the decoder pair has ended.

5. An apparatus for producing a real-time video stream from MPEG-2 encoded video clips, said apparatus comprising:

a video server for storing the MPEG-2 encoded video clips, and an MPEG-2 decoder pair coupled to the video server for producing the real-time video stream from segments of the MPEG-2 encoded video clips stored in the video server;

an operator control station coupled to the video server for transmitting a play list and edit commands from an operator to the video server for controlling and editing content of the real-time video stream; and wherein the video server includes cached disk storage for storing the MPEG-2 encoded video clips, a data mover computer coupled to the cached disk storage for streaming the segments of the MPEG-2 encoded video clips from the cached disk storage to the MPEG-2 decoder pair, and a controller server computer coupled to the data mover computer for controlling the data mover computer in response to the play list and edit commands from the operator control station; and further including a video switch coupled to the decoders in the decoder pair for selecting a video output from either one of the decoders in the decoder pair for production of the real-time video stream by switching from the video output from one of the decoders in the decoder pair to a specified In-point frame in the video output from the other of the decoders in the decoder pair, wherein the In-point frame is selectable as any frame and any frame type in a group of pictures (GOP) structure of the MPEG-2 encoded video, the decoders in the decoder pair being coupled to the data mover computer for receiving segments of the MPEG-2 encoded video clips for the production of the real-time video stream, and further including a decoder controller coupled to the decoders and the video switch for controlling the decoders and the video switch, the decoder controller being coupled to the data mover computer for receiving control commands for the production of the real-time video stream, wherein the control commands include configuration commands to allow the video server to configure the decoders in the decoder pair by setting operational modes of the decoders in the decoder pair, streaming commands to control the In-points of the MPEG-2 video clips included in the real-time video stream, asynchronous status report commands to enable asynchronous status reports of significant decoding events to be transmitted from the decoder pair to the video server when the decoding events occur, and edit commands to allow the decoders in the decoder pair to be controlled for editing content of the real-time video stream;

wherein the data mover computer is programmed to prepare for switching from the video output from one of the decoders in the decoder pair to a specified In-point frame in the video output from the other of the decoders in the decoder pair by initiating a stream of MPEG-2 encoded data from the data mover computer to the other of the decoders in the decoder pair in response to a request from the other of the decoders in the decoder pair;

wherein the apparatus further includes a house clock generator coupled to the video server and the MPEG-2 decoder pair for switching to the specified In-point frames when the house clock generator provides respective specified time code values; and wherein the control commands include asynchronous status report commands to enable the video server to receive asynchronous status reports from the decoder pair when decoding of a first clip by the decoder pair has started and when decoding of a second clip by the decoder pair has ended.

* * * * *

UNITED STATES PATENT AND TRADEMARK OFFICE
CERTIFICATE OF CORRECTION

PATENT NO. : 7,174,561 B2  Page 1 of 1
APPLICATION NO. : 09/834427
DATED : February 6, 2007
INVENTOR(S) : Bixby et al.

It is certified that error appears in the above-identified patent and that said Letters Patent is hereby corrected as shown below:

Claim 1, col. 27, line 40 "GOP" is changed to --(GOP)--.

Claim 3, col. 28, line 32, "clips:" is changed to --clips;--.

Claim 3, col. 28, line 41, "GOP" is changed to --(GOP)--.

Signed and Sealed this

Third Day of July, 2007

JON W. DUDAS
*Director of the United States Patent and Trademark Office*